US012715770B2

(12) United States Patent
Hoff et al.

(10) Patent No.: US 12,715,770 B2
(45) Date of Patent: Aug. 25, 2026

(54) METHODS FOR OXIDIZING A NITROGEN OXIDE TO NITRATE

(71) Applicant: UNIVERSITY OF MIAMI, Miami, FL (US)

(72) Inventors: Carl Hoff, Miami, FL (US); Oswaldo Guio, Miami, FL (US)

(73) Assignee: UNIVERSITY OF MIAMI, Miami, FL (US)

( * ) Notice: Subject to any disclaimer, the term of this patent is extended or adjusted under 35 U.S.C. 154(b) by 490 days.

(21) Appl. No.: 18/286,788

(22) PCT Filed: Apr. 15, 2022

(86) PCT No.: PCT/US2022/025003
§ 371 (c)(1),
(2) Date: Oct. 13, 2023

(87) PCT Pub. No.: WO2022/221653
PCT Pub. Date: Oct. 20, 2022

(65) Prior Publication Data

US 2024/0190706 A1 Jun. 13, 2024

Related U.S. Application Data

(60) Provisional application No. 63/175,241, filed on Apr. 15, 2021.

(51) Int. Cl.

| | |
|---|---|
| ***C01B 21/48*** | (2006.01) |
| ***C01B 21/50*** | (2006.01) |
| ***C05C 5/00*** | (2006.01) |

(52) U.S. Cl.
CPC .............. *C01B 21/48* (2013.01); *C01B 21/50* (2013.01); *C05C 5/00* (2013.01)

(58) Field of Classification Search
None
See application file for complete search history.

(56) References Cited

U.S. PATENT DOCUMENTS

| | | | | |
|---|---|---|---|---|
| 1,954,415 A | | 4/1934 | Kipper | |
| 2,609,273 A | * | 9/1952 | Balcar | C01B 21/22 423/400 |
| 3,881,004 A | * | 4/1975 | Kelly | C01B 21/26 423/235 |
| 4,308,246 A | | 12/1981 | Harteck | |
| 5,122,505 A | | 6/1992 | Gusman et al. | |
| 5,705,136 A | * | 1/1998 | Drago | C01B 21/02 502/343 |

(Continued)

FOREIGN PATENT DOCUMENTS

| | | |
|---|---|---|
| FR | 798 224 A | 5/1936 |
| GB | 190200698 A | 3/1902 |
| WO | WO-2004/058638 A1 | 7/2004 |

OTHER PUBLICATIONS

"BASF—The Right Choice for Nitric Acid Plant" (2012).

(Continued)

*Primary Examiner* — John J Figueroa
(74) *Attorney, Agent, or Firm* — MARSHALL, GERSTEIN & BORUN LLP

(57) ABSTRACT

Provided herein is a process for preparing a nitrate comprising contacting a nitrogen oxide with a metal oxide under milling conditions to form a nitrate.

27 Claims, 20 Drawing Sheets

| NAME | Description |
|---|---|
| 2-17-21 Na2O KBr N2O pellet cell #1 4 hrs milling | Sample 004 By hoff Date Wednesday, Febru.... |
| 2-17-21 pellet cell 1 157.0 mg na20 kbr n20 2.5 hours milling | Sample 003 By hoff Date Wednesday, Febru.... |
| 2-18-21 pellet cell #1 na2o kbr n2o 6 hours milling | Sample 025 By hoff Date Thursday, Februar.... |
| 2-19-21 pellet Cell 1 NaNO2 N2Oreaction after 8 hoursa | Sample 047 By hoff Date Friday, February 1... |
| 2-22-21 Cell 1 na2O kBr N2O 11.5 hour milling | Sample 077 By hoff Date Monday, February... |
| 2-23-21 Cell 1 Na2O KBr N2O 14 hour milling_1 | Sample 080 By hoff Date Monday, February... |

(56) References Cited

U.S. PATENT DOCUMENTS

2010/0256022 A1 10/2010 Hitzman et al.
2015/0218672 A1 8/2015 Drinkard et al.
2018/0244588 A1 8/2018 Garcia Martinez et al.

OTHER PUBLICATIONS

"Road map to a US Hydrogen Economy" Fuel Cell and Hydrogen Energy Association 2020.
Abata et al., "Thermal-Decomposition of Sodium Trans-Hyponitrite," J. Phys. Chem. Us. 1989, 93(8), 3368-3372.
Achord et al., "The Role of U-Backbonding in the Strengths of N-donor to Molybdenum Bonds. Experimental and Computational Studies of Enthalpies of Binding of Dintrogen, Diazoalkanes, Azides, Nitriles, and Pyridines to Mo(PiPr3)2(CO)3 ," Inorg. Chem. 2009, 48, 7891.
Addison et al., "The Oxidation of Sodium Hyponitrite and Sodium Alpha-Oxyhyponitrite with Dinitrogen Tetroxide," J. Chem. Soc. Feb. 1952, 346-356.
Andrews et al., "Evidence for Platinum(II) Oxo Intermediates in Reactions of (Diphosphine)platinum(II) Carbonate Complexes", Inorg. Chem. 1996, 35, 57405742.
Bayrakdar et al., "Dinuclear Gold(I) Complexes Bearing Alkyl-Bridged Bis(N-heterocyclic carbene) Ligands as Catalysts for Carboxylative Cyclization of Propargylamine: Synthesis, Structure, and Kinetic and Mechanistic Comparison to the Mononuclear Complex [Au(IPr)Cl]," Organometallics 2020, 39 (15), 2907-2916.
Bilke et al., "Methane to Chloromethane by Mechanochemical Activation: A Selective Radical Pathway," J. Am. Chem. Soc. 2019, 141 (28), 11212-11218.
Blomberg, "Role of the Two Metals in the Active Sites of Heme Copper Oxidases—A Study of NO Reduction in cbb(3) Cytochrome c Oxidase," Inorg. Chem. 2020, 59 (16), 11542-11553.
Blunden et al., "The structure of bis(trialkyltin) carbonates: Evidence for two non-equivalent tin sites," J. Organomet. Chem. 1984, 267 (2), c5-c8.
Brandes et al., "New Developments in the Marine Nitrogen Cycle," Chem. Rev. 2007, 107, 577-589.
Cai et al., "N-heterocyclic carbene complexes of palladium in oxygen atom transfer reactions involving the making and breaking of N—O bonds," Inorg. Chimica Acta., 468:285-293 (2017).
Cai et al., "Thermodynamic, Kinetic, and Mechanistic Study of Oxygen Atom Transfer from Mesityl Nitrile Oxide to Phosphines and to a Terminal Metal Phosphido Complex", Inorg. Chem. 2011, 50, 9620.
Cai et al., "Thermodynamic, Kinetic, Structural, and Computational Studies of the Ph3Sn—H, Ph3Sn—SnPh3, and Ph3Sn—Cr(CO)(3)C5Me5 Bond Dissociation Enthalpies," Inorg Chem 2016, 55 (20), 10751-10766.
Capps et al., "Kinetic and Thermodynamic Studies of Reaction of Cr(CO)3C5Me5 and PhS Cr(CO)3C5Me5 with NO. Reductive Elimination of Thermodynamically Unstable Molecules HNO and RSNO Driven by Formation of the Strong Cr—NO Bond", Inorg. Chem. 1999, 38, 6206.
Capps et al., "Reaction of NO with Tungsten Thiolate and Thiol Complexes: Elimination of PhSNO from W(phen)(CO)2(SPh)2, CO from W(phen)(CO)2(1,2-(-S)2-Arene, and HNO from W(phen)(CO)3(RSH)", Inorg. Chem. 1999, 38, 6216.
Cenini et al., "Zerovalent platinum chemistry. VIII. The reactions of nitric oxide with tris- and tetrakis (triphenylphosphine) platinum(0)," Inorg. Chim. Acta 1972, 6, 182-184.
D'Ambro et al., "Molecular composition and volatility of isoprene photochemical oxidation secondary organic aerosol under low- and high-NOx conditions," Atmos. Chem. Phys. 2017, 17 (1), 159-174.
Davis et al., "Mechanistic Pathways for N2O Elimination from trans-R3Sn—O—N—N—O—SnR3 and for Reversible Binding of CO2 to R3Sn—O—SnR3 (R=Ph, Cy)," Inorg. Chem., 60(16):12075-12084 (2021).
Davis et al., "Production of cis-Na2N2O2 and NaNO3 by Ball Milling Na2O and N2O in Alkali Metal Halide Salts", ACS Omega, 6:18248-18252 (2021).
Davis et al., "The Mechanism of Carboxylative Cyclization of Propargylamine by N-Heterocyclic Carbene Complexes of Au(I)," J. Organomet. Chem. 2020, online.
Davis, "An Experimental and Computational Comparison of the Reactions of N2O and CO2 in Several Inorganic Systems," University of Miami Thesis (2021).
Efremenko et al., "DFT Study of the Structure and Reactivity of the Terminal Pt(IV)-Oxo Complex Bearing No Electron-Withdrawing Ligands," J. Am. Chem. Soc. 2010, 132 (42), 14886-14900.
Elishav et al., "Progress and Prospective of Nitrogen-Based Alternative Fuels," Chem. Rev. 2020, 120 (12), 5352-5436.
Farias et al., "Nonuniform Synergistic Effect of Sn and Ru in Site-Specific Catalytic Activity of Pt at Bimetallic Surfaces toward CO Electro-oxidation," Acs Catal. 2017, 7 (5), 3434-3445.
Feldmann et al., cis-Natrium hyponitrit. Z. Anorg. Allg. Chem. 1997, 623, 1803-1809.
Feldmann et al., "cis-Sodium Hyponitrite—A New Preparative Route and a Crystal Structure Analysis", Chem., Int. Ed., 35,:1728-1730 (1996).
Fortman et al., "Spectroscopic Detection and Theoretical Confirmation of the Role of Cr2(CO)5(C5R5)2 and UCr(ketene)(CO)2(C5R5) as Intermediates in Carbonylation of N=N=CHSiMe3 to O=C=CHSiMe3 Catalyzed by UCr(CO)3(C5R5) (R=H, CH3)", J. Am. Chem. Soc. 2007, 129, 14388.
Gaidei, "Nitrous Oxide: Properties, Producing, Grounds of Manipulations, and Fields of Application", Russ. J. Appl. Chem. 2009, 86, 109.
Gamage, "Group 10 to 11 Transition Metal Complexes for Small Molecule Activation and Catalysis," University of Miami PhD Thesis (2021).
Gao et al., "Current Understanding of Cu-Exchanged Chabazite Molecular Sieves for Use as Commercial Diesel Engine DeNO(x) Catalysts," Top Catal. 2013, 56 (15-17), 1441-1459.
Gao et al., "Selective Catalytic Reduction over Cu/SSZ-13: Linking Homo- and Heterogeneous Catalysis," J. Am. Chem. Soc. 2017, 139 (13), 4935--4942.
Gaston, "Reexamining Dust Chemical Aging and Its Impacts on Earth's Climate," Accounts Chem. Res. 2020, 53 (5), 1005-1013.
Gekhman et al., "Oxidation of Molecular Nitrogen with Hydrogen Peroxide", Russ. Chem. Bull. 2003, 52, 768.
Gomez et al., "Ca(NO3)2-NaNO3-KNO3 Molten Salt Mixtures for Direct Thermal Energy Storage Systems in Parabolic Trough Plants", J. Solar Energy Eng. 2013, 135 021017-1.
Gonzalez et al., Synthesis of (PCy3)2Cr(CO)3 and its Reactions with Hydrogen, Nitrogen, and Other Ligands, J. Am. Chem. Soc., 110:4419-4421 1988.
Gonzalez et al., The Entropy of Binding of Molecular Hydrogen and Nitrogen in the Complexes (P(C6H11)3)2M(CO)3, M=Cr, Mo, W, Inorg. Chem., 1989, 28, 4295.
Gonzalez et al., "Thermodynamic and Kinetic Studies of Molecular Hydrogen and Nitrogen Complexes of Cr, Mo, and W", ACS Symposium Series, 428 133 1990.
Goyal et al., "Redox Chemistry of Hyponitrous Acid .4. Stoichiometry, Kinetics and Mechanism of Oxidation by Cerium(Iv) in Acid Sulfate-Solutions, and Determination of Hyponitrous Acid in Acid Perchlorate Solution,". Indian J. Chem. A 1989, 28 (5), 382387.
Guio, "Mechanochemical Conversion of Greenhouse Gases to Fertilizer: Kinetic, Thermodynamic, and Mechanistic Studies of Metal Oxide Reaction with CO2 to Form Carbonates and N2O to Form Nitrates," University of Miami PhD Thesis (2023).
Gunaydin et al., "Molecular Dynamics Simulation of the HOONO Decomposition and the HO•/NO2• Caged Radical Pair in Water", J. Am. Chem. Soc. 2008, 130, 10036-10037.
Haber, "Thermodynamik technischer Gasreaktionen. Sieben Vorlesungen". Ber. Bunsen-Ges.1905. 11 519.
Hadjiivanov et al., "Power of Infrared and Raman Spectroscopies to Characterize Metal-Organic Frameworks and Investigate Their Interaction with Guest Molecules," Chem. Rev. 2021, 121 (3), 1286-1424.

(56) References Cited

OTHER PUBLICATIONS

Hase et al., "Mechanistic Aspects of the Carboxylative Cyclization of Propargylamines and Carbon Dioxide Catalyzed by Gold(I) Complexes Bearing an N-Heterocyclic Carbene Ligand," ACS Catal. 2015, 5 (9), 5135-5140.
Hase et al., "NHC-Gold(I) Complexes as Effective Catalysts for the Carboxylative Cyclization of Propargylamines with Carbon Dioxide," Organometallics 2013, 32 (19), 5285-5288.
Holmes, "Organotin Cluster Chemistry," Accounts Chem. Res. 1989, 22 (5), 190-197.
International Search Report and Written Opinion for Application No. PCT/US2022/025003, dated Jul. 7, 2022.
Johnson et al., "On the Origin of Selective Nitrous Oxide N—N Bond Cleavage by Three-Coordinate Molybdenum Complexes", J. Am. Chem. Soc., 2001, 123, 7271-7286.
Joo et al., "An experimental and theoretical evaluation of the reactions of silver hyponitrite with phosphorus halides. In search of the elusive phosphorus-containing hyponitrite," J. Phys. Chem. A 2005, 109 (7), 1420-1429.
Keresztury et al., "CO2 Inclusion Bands in Ir-Spectra of Kbr Pellets," Spectrochim Acta A 1980, 36 (11), 1007-1008.
Khivantsev et al., "Economizing on Precious Metals in Three-Way Catalysts: Thermally Stable and Highly Active Single-Atom Rhodium on Ceria for NO Abatement under Dry and Industrially Relevant Conditions," Angew. Chem. Int. Edit. 2020.
Kokalj et al., "A DFT study of the structures of N2O adsorbed on the Pd(110) surface," J. Phys. Chem. B 2003, 107 (12), 2741-2747.
Koppenol et al., "Peroxynitrite, a Cloaked Oxidant Formed by Nitric-Oxide and Superoxide," Chem. Res. Toxicol. 1992, 5 (6), 834-842.
Kubas et al., "Thermodynamic and Kinetic Study of the Complexes (PCy3)2W(CO)3(L), L=H2, N2, NCCH3, pyridine, P(OMe)3, and CO," Organometallics, 1988, 7, 2429.
Kwak et al., "Excellent activity and selectivity of Cu-SSZ-13 in the selective catalytic reduction of NOx with NH3," J. Catal. 2010, 275 (2), 187-190.
Kwak et al., "Understanding the nature of surface nitrates in BaO/gamma-Al2O3 NOx storage materials: A combined experimental and theoretical study," J. Catal. 2009, 261 (1), 17-22.
La Pierre et al., "Carbon Monoxide, Isocyanide, and Nitrile Complexes of Cationic, d(0) Vanadium Bisimides: pi-Back Bonding Derived from the pi Symmetry, Bonding Metal Bisimido Ligand Orbitals," Inorg. Chem. 2012, 51 (24), 13334-13344.
Lewis et al., "Thermodynamics—The Free Energy of Chemical Substances," McGraw Hill, New York 1923.
Li et al., "A General Mechanism for Stabilizing the Small Sizes of Precious Metal Nanoparticles on Oxide Supports," Chem Mater 2014, 26 (19), 5475-5481.
Li et al., "Phosphine-based platinum(II) hydroxo and oxo complexes," Inorg. Chem. 1996, 35 (3), 604-613.
Liu et al., "Pressure induced phase transition and amorphization of Na3ONO2," Phys. Chem. Chem. Phys. 2004, 6 (5), 881-883.
Lymar et al., "CO2-catalyzed one-electron oxidations by peroxynitrite: Properties of the reactive intermediate," Inorg. Chem. 1998, 37 (2), 294-301.
Lymar et al., "One-electron reduction of aqueous nitric oxide: A mechanistic revision," Inorg. Chem. 2005, 44 (15), 5212-5221.
Majumdar et al., "Role of Axial Base Coordination in Isonitrile Binding and Chalcogen Atom Transfer to Vanadium(III) Complexes", Inorg. Chem. 2014, 53, 11183.
Mayer et al., "Crystal and Molecular Structure of the trans-Hyponitrite Compound Ph3Sn(ONNO)SnPh3," Z Anorg. Allg. Chem. 2011, 637 (3-4), 345-347.
Mei et al., "First-Principles Analysis of NOx Adsorption on Anhydrous gamma-Al2O3 Surfaces," J. Phys. Chem. C 2009, 113 (18), 7779-7789.
Meizyte et al., "Free electron laser infrared action spectroscopy of nitrous oxide binding to platinum clusters, Pt-n(N2O)(+)," Phys. Chem. Chem. Phys. 2020, 22 (33), 18606-18613.
Mendenhall, "The Lewis Acid-Catalyzed Reaction of Trans-Hyponitrite lon with Alkyl-Halides," Tetrahedron Lett 1983, 24 (5), 451-452.
Miller et al., "A mechanistic study of nitrous oxide adsorption and decomposition on zirconia," Catal. Lett. 1997, 46 (3-4), 213-221.
Mitroo et al., "CINO2 Production from N2O5 Uptake on Saline Playa Dusts: New Insights into Potential Inland Sources of CINO2," Environ. Sci. Technol. 2019, 53 (13), 7442-7452.
Muckerman et al., "Theoretical investigation of the binding of small molecules and the intramolecular agostic interaction at tungsten centers with carbonyl and phosphine ligands," J. Phys. Chem. B 2007, 111 (24), 6815-6821.
Nguyen et al., "Structures, Bonding, and Energetics of N2O2 Isomers", J, Phys. Chem. 1994, 98, 10072-10078.
Ogle et al., "Decomposition Rates, Synthesis, and Spectral Properties of a Series of Alkyl Hyponitrites," J. Org. Chem. 21, 3728-3733.
Oza et al., "The Thermal Decomposition of Calcium Hyponitrite Tetrahydrate," J. Chem. Soc. Mar. 1953, 909-913.
Oza et al., "The Thermal Decomposition of Silver Hyponitrite," J. Am. Chem. Soc. 1955, 77 (19), 4976-4980.
Oza, "Reactions of Hyponitrites and Nitrites," Nature 1955, 175 (4452), 385-386.
Palluccio et al. "Ligand-Directed Reactivity in Dioxygen and Water Binding to cis-[Pd(NHC)2(n2-O2)]", J. Am. Chem. Soc 2018, 140, 1, 264-276.
Palluccio et al., "Binding of Nitriles and Isonitriles to V(III) and Mo(III) Complexes:Ligand vs Metal Controlled Mechanism," Inorg. Chem., 62:10559-10571 (2023).
Palluccio et al., "Thermodynamic and Kinetic Study of Cleavage of the N?O Bond of N?Oxides by a Vanadium(III) Complex: Enhanced Oxygen Atom Transfer Reaction Rates for Adducts of Nitrous Oxide and Mesityl Nitrile Oxide", J. Am. Chem. Soc., 2013 135 11357.
Pfleger et al., "Thermal energy storage- overview and specific insight into nitrate salts for sensible and latent heat storage", Beilstein. J. Nanotechnol. 2015; 6: 1487-1497.
Poskrebyshev et al., "Disproportionation pathways of aqueous hyponitrite radicals (HN2O2 center dot/N2O2 center dot-)," J. Phys. Chem. A 2008, 112 (36), 8295-8302.
Poskrebyshev et al., "Hyponitrite radical, a stable adduct of nitric oxide and nitroxyl," J. Am. Chem. Soc. 2004, 126 (3), 891-899.
Quinga et al., "Substituent effects and isokinetic relations in the homolysis of hyponitrite esters. The question of free-radical homoconjugation," The Journal of Organic Chemistry 1985, 50 (16), 2836-2840.
Ramesh et al., "Chapter Four—Zeolites and Their Potential Uses in Agriculture," In Advances in Agronomy, Sparks, D. L., Ed. Academic Press: 2011; vol. 113, pp. 219-241.
Ravishankara et al., "The Dominant Ozone-Depleting Substance Emitted in the 21st Century," Science 2009, 326, 123-125.
Ryder et al., "On the Role of Particle Inorganic Mixing State in the Reactive Uptake of N2O5 to Ambient Aerosol Particles," Environ. Sci. Technol. 2014, 48 (3), 1618-1627.
Senna et al., "Modification of tin oxide nanoparticles by fluorocarbon solids via a mechanochemical route," J. Nanopart. Res. 2015, 17 (9).
Severin, "Synthetic chemistry with nitrous oxide," Chem. Soc. Rev. 2015, 44 (17), 6375-6386.
Shestakov et al. "On the Coupled Oxidation-reduction Mechanism of Molecular Nitrogen Fixation", Russ. Chem. Bull. 2001, 50, 2054.
Shestakov et al., "Is Nitrous Oxide an Intermediate Product in the Oxidation of Molecular Nitrogen by Vanadium Peroxo Complexes?", Mendeleev Commun. 2004, 14, 117.
Shestakov et al., "Theoretical Study of Oxidation of Molecular Nitrogen with Vanadium Peroxo Complexes", Russ. Chem. Bull. 2003, 52, 1455.
Shiflett et al., "Separation of N2O and CO2 Using Room-Temperature Ionic Liquid [bmim][BF4]". J. Phys. Chem. B 2011, 115, 3478-3487.
Squadrito et al., "Mapping the reaction of peroxynitrite with CO2: Energetics, reactive species, and biological implications," Chem. Res. Toxicol. 2002, 15 (7), 885-895.

(56) References Cited

OTHER PUBLICATIONS

Sukcharoenphon et al., Dinuclear Oxidative Addition of N—H and S—H Bonds at Chromium. Reaction of UCr(CO)3C5Me5with {o-(HA)C6H4S—Cr(CO)3C5Me5 } (A=S, NH) Yielding [U2-o-(U—A)C6H4SCr(C5Me5)]2 and H—Cr(CO)3C5Me5. Inorg. Chem. 2002, 41, 6769-6774.

Sukcharoenphon et al., "Synthesis and Structure of W(U2-SPy)2(CO)3 (SPy=2-Mercaptopyridine) and Its Reaction with PyS-SPy to Yield W(U2-SPy)4 ; NO to Yield W(U2-SPy)2(NO)2, and with NO/PyS-SPy to Yield W(U2-SPy)3(NO)", Inorg. Chem. 2001, 40, 2402-2408.

Szanyi et al., "NO 2 adsorption on BaO/Al2O3: The nature of nitrate species," J Phys Chem B 2005, 109 (1), 27-29.

Temprado et al., "Synthesis, structure, and thermochemistry of adduct formation between N-heterocyclic carbenes and isocyanates or mesitylnitrile oxide," Structural Chemistry 24(6): (2013).

Vosper, "Oxidation of Sodium Hyponitrite and Sodium Oxyhyponitrite with Dinitrogen Tetroxide," J. Chem. Soc. A 1968, (10), 2403.

Wright et al., "Understanding the Role of Hyponitrite in Nitric Oxide Reduction," Inorg. Chem. 2015, 54 (19), 9330-9341.

* cited by examiner

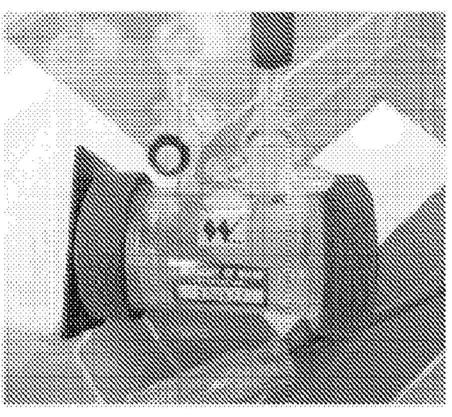
FIGURE 12A
FIGURE 12B
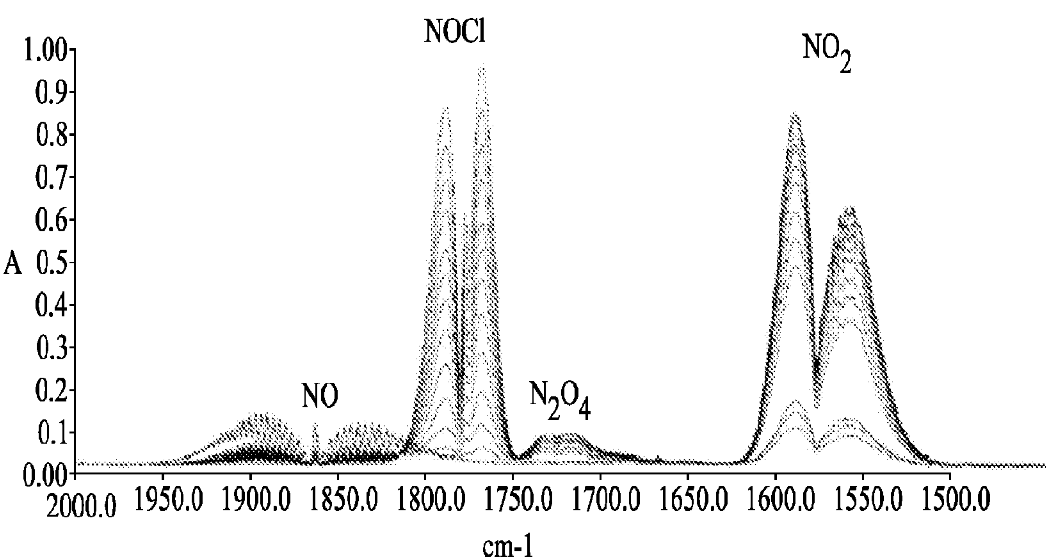
The peak due to NO goes down, NOCl and NO2 go up and then down, N2O4 is the dimer of NO2 and is in equilibrium with it.
FIGURE 13

METHODS FOR OXIDIZING A NITROGEN OXIDE TO NITRATE

CROSS-REFERENCE TO RELATED APPLICATIONS

This application claims the benefit of priority to U.S. Provisional Patent Application No. 63/175,241 filed Apr. 15, 2021, the disclosure of which is incorporated herein by reference in its entirety.

STATEMENT REGARDING FEDERALLY SPONSORED RESEARCH

This invention was made with government support under Award Number DE-SC0019456 awarded by the Department of Energy. The Government has certain rights to the invention.

BACKGROUND

Nitrous oxide is a potent greenhouse gas emitted in both agricultural and industrial chemistry and is approximately 300 times worse than carbon dioxide. Nitrous oxide is also generally present in $N_xO_y$ which are general pollutants that are formed in several important industrial processes, as well as exhaust gases from internal combustion engines (e.g., automotive exhaust). Existing technologies reduce nitrous oxide to nitrogen as shown in equations (1)-(3):

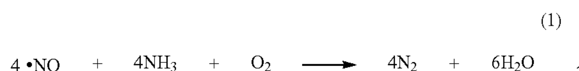

$$4\,{\bullet}NO + 4NH_3 + O_2 \longrightarrow 4N_2 + 6H_2O \quad (1)$$

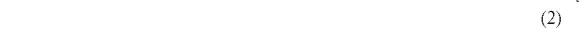

$$6\,{\bullet}NO + 8NH_3 + O_2 \longrightarrow 7N_2 + 12H_2O \quad (2)$$

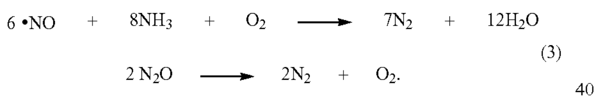

$$2\,N_2O \longrightarrow 2N_2 + O_2. \quad (3)$$

These reactions were developed primarily to deal with effluent from combustion of ammonia to produce nitric acid in the Ostwald process, which is the current principle source of NxOy pollution. There is considerable recent interest in combustion of ammonia as a power source that does not emit carbon dioxide. By way of example, the testing of cargo ships utilizing $NH_3$ as a fuel source in ongoing. However, a challenge that must be overcome is that the combustion of $NH_3$ produces $NO_x$, including $N_2O$, wherein the removal is done by reactions (1)-(3). Most schemes for abatement in these systems reduce gaseous ·NO, $\cdot NO_2$ and $N_2O$ to gaseous $N_2$. This is done in an uneconomical method in terms of atom economy and energy consumption.

In view of the foregoing, there remains a need for processes for converting nitrogen oxides to less harmful and/or usable forms (e.g., nitrate for crop fertilization).

BRIEF DESCRIPTION OF THE FIGURES

FIG. 12A shows the reaction of ·NO(g) and $N_2O$(g) with $KO_2\cdot$(s) and $Na_2N_2O_2$(s) (left) after about 3 minutes reaction in the FTIR spectrometer.

FIG. 12B shows the reaction of ·NO(g) and $N_2O$(g) with $KO_2\cdot$(s) and $Na_2N_2O_2$(s) (left) after about 10 minutes reaction in the FTIR spectrometer showing the complete bleaching of the gas phase and solid phase to a white powder containing only nitrate and nitrite products.

FIG. 13 shows bands observed in reaction of a ball milled mixture of 1.5 g KCl, 0.5 g $NaNO_2$, 0.5 g $Na_2O$ for 4 hours which produced a mixture of $NaNO_3$ and $Na_2O_2$ in KCl as the dominant entries. This mixture was then place in an FTIR gas cell with $CaF_2$ windows and filled with a 1.5% ·NO(g) in balance N2(g). Reaction was initiated by injection of 5 mL $O_2$ into the gas phase.

DETAILED DESCRIPTION

Figure 1A:
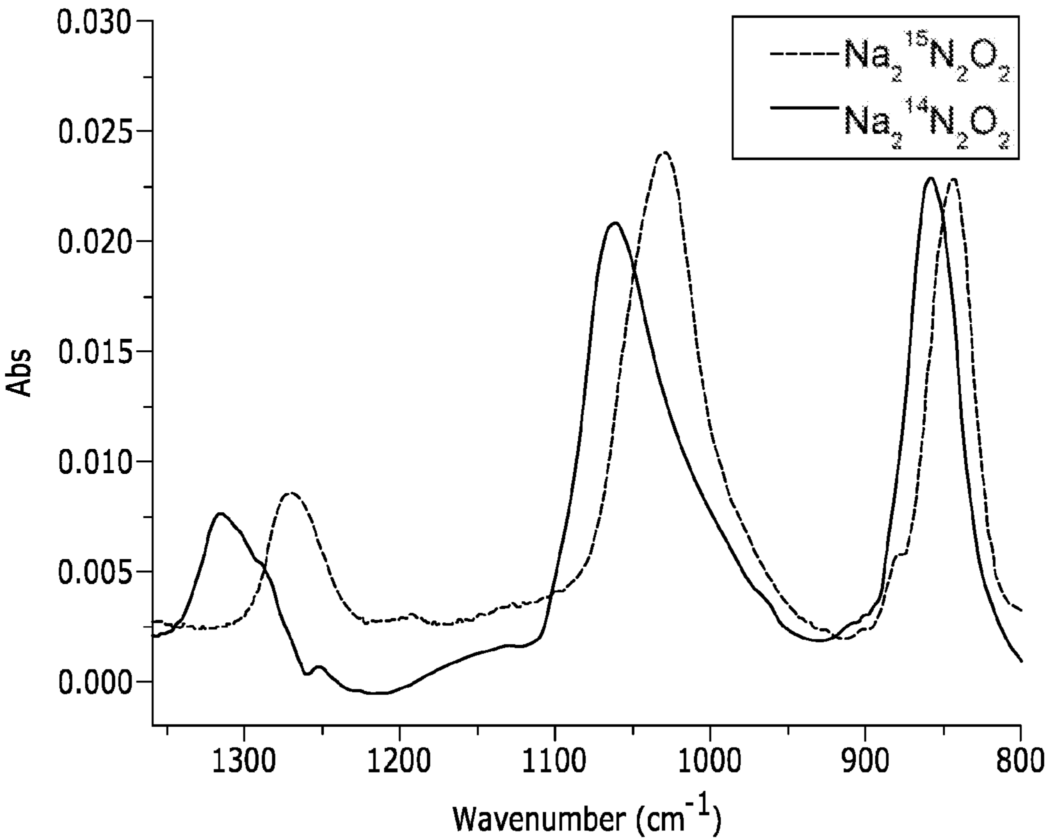
FIG. 1A shows the FTIR spectroscopic data showing initial formation of cis-$Na_2N_2O_2$ and $NaNO_3$ in KBr.

Provided herein are processes to convert NO/$N_2O$ exhaust gas (e.g., waste) to nitrate in a form that may be used directly (e.g., for crop fertilization). In contrast to conventional processes, the disclosed processes comprise further oxidation of $N_xO_y$ rather than reduction. The Ostwald process itself can in principle be replaced by a much greener approach. The processes disclosed herein advantageously provide a new route to conversion at low temperatures and low pressures using mechanical chemical activation of salts to trap and oxidize $NO_x$ and $N_2O$ to nitrate.

The harsh pollution arising from ·NO, $·NO_2$ and their reaction products with air has been apparent for more than a century. The need to also remove waste N2O has increased after it became recognized as a significant atmospheric greenhouse gas three hundred times more harmful than carbon dioxide. The BASF $DeNO_x$ process (equation (3) above) destroys it by high temperature thermal decomposition of a ceria-based catalysts covered with platinum gauze. In addition to destruction of valuable $NH_3$ in the $DeNO_x$ process, it also wastes the chemical potential present of a set of reactive species {·NO, $·NO_2$, $N_2O$} which could be further oxidized rather than reduced.

Nearly a century ago Lewis and Randal used thermodynamic data to calculate that there is a nearly balanced equilibrium between dinitrogen and nitric acid as shown in eqn. (4):

(4)

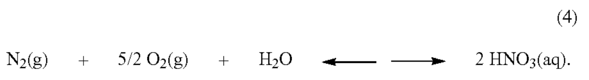

In principle this would provide a lower energy "green" approach to the Ostwald process in which ammonia is burned to produce nitric acid and nitrates. Thermodynamic data show clearly that further oxidation of ·NO, $·NO_2$ and $N_2O$ to nitrate is favorable at low temperatures if nitric acid is the product, and for production of alkali metal nitrates the window of opportunity is considerably higher. The most difficult gas to deal with in terms of production of nitrate is nitrous oxide. As part of a broader program aimed at converting the mixture ·NO, $·NO_2$ and $N_2O$ to a useful product, we have looked at part at reaction of the individual components. Extensive kinetic studies in the gas phase are available since reduction of diesel exhaust emissions has also been widely studied. The road to further oxidation is less studied for the simple reason that nitric acid cannot be emitted from exhaust. However trapping the gases in designed metal oxides could lead to production of a solid material which could be used directly for agricultural fertilization.

As an initial goal towards investigating the feasibility of designing a catalyst for reaction (4) an easier but still challenging project is the conversion of waste $N_2O$ into nitrate as shown in eqn. (5):

(5)

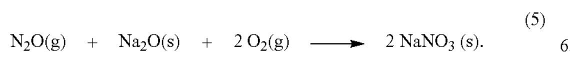

Thermodynamic data for this reaction show that $\Delta H^0=-95$ kcal/mol, $\Delta S^0=-70$ cal/mol deg which is a large enough driving force to make it feasible over a range of temperature. The thermodynamic stability of expected intermediates for reaction (5) is less and it is well known that the "deeper" oxidation of nitrogen is more favorable than its "early" oxidation. For that reason the stability and reactivity of $Na_2N_2O_2$ which in both its cis and trans forms may be pivotal to developing a catalytic system for eqn. (5), and ultimately finding conditions to catalyze equilibrium formation of nitrate by eqn (4).

Due to the fact that enzymatic reduction of nitric oxide often proceeds through a hyponitrite that eliminates nitrous oxide there have been numerous studies of nitrous oxide from hyponitrites. Studies of oxidation of binding of nitrous oxide and its further oxidation to nitrite or nitrate are rare. There are numerous studies of binding of nitrous oxide and its reduction as shown in eqn. (3). Yet, there are no reports of nitrous oxide binding and subsequent oxidation in a direct reaction. Studies on oxidation of trans metal hyponitrites have been done by Oza, Mendenhall, Addison and Gould. The binding of nitrous oxide to sodium oxide to produce cis-$Na_2$N2O$_2$ at 360° C. (eqn 6) was reported by Jansen and Feldman as well as its later decomposition at 360° C. to orthonitrite.

(6)

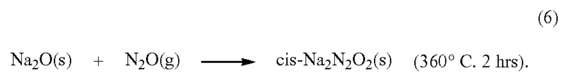

This complex is reported to decompose to orthonitrite at a temperature of approximately 360° C. Thus, there is a narrow window of stability to prepare this little studied complex.

This disclosure describes studies of binding of nitrous oxide to sodium oxide under ball milling conditions. There has been a surge of activity in the area of mechanical chemical activation and catalysis which offers several advantages when dealing with gases reacting and sticking to solids to produce a solid product. The work of the Schuth group, in particular the oxidation reactions utilizing chlorination reactions at lower temperatures than typically needed prompted us to attempt this in nitrous oxide chemistry. At higher temperatures gas release rather than absorption becomes increasingly favorable for entropic reasons. This appears to provide an advantage in the disclosed processes compared to higher temperature reactions where gas release rather than binding becomes thermodynamically favored for entropic reasons.

In some embodiments, the disclosure provides processes comprising mixing oxide/peroxide/superoxide catalysts with added transition metal catalyst and support by ball milling to prepare a matrix capable of trapping and converting both $N_2O$ and NO to nitrate.

The disclosure provides processes for preparing a nitrate comprising contacting a nitrogen oxide with a metal oxide under milling conditions to form a nitrate.

Initial investigation of ball milling of $Na_2O$ and $N_2O$ was done to find a lower temperature route to cis-$Na_2N_2O_2$ than the 360° C. reported by Jansen and Feldmen. In part the fact a pure crystalline form is produced implies that lattice energy contributions may play a significant role in the stability. The decomposition of amorphous cis-$Na_2N_2O_2$ has been reported to occur at temperatures above 100° C. In initial ball milling studies, reactions of $Na_2O$ alone, or in the presence of silica gel, zeolites, fluorocarbon oil, and silicone oil were done by loaded the cell and heating it in an oven at 80° C. or 140° C. and then placing the cell in the RETSCH mm500 mixer mill and filling it with $N_2O$ and ball milling for as long as eight hours. Infrared studies did not indicate formation of cis-$Na_2N_2O_2$ or other products. The fluorocarbon oil under these conditions was found to react with the sodium oxide presumably forming sodium fluoride and a O cross linked polymer that was difficult to clean.

Figure 1B:
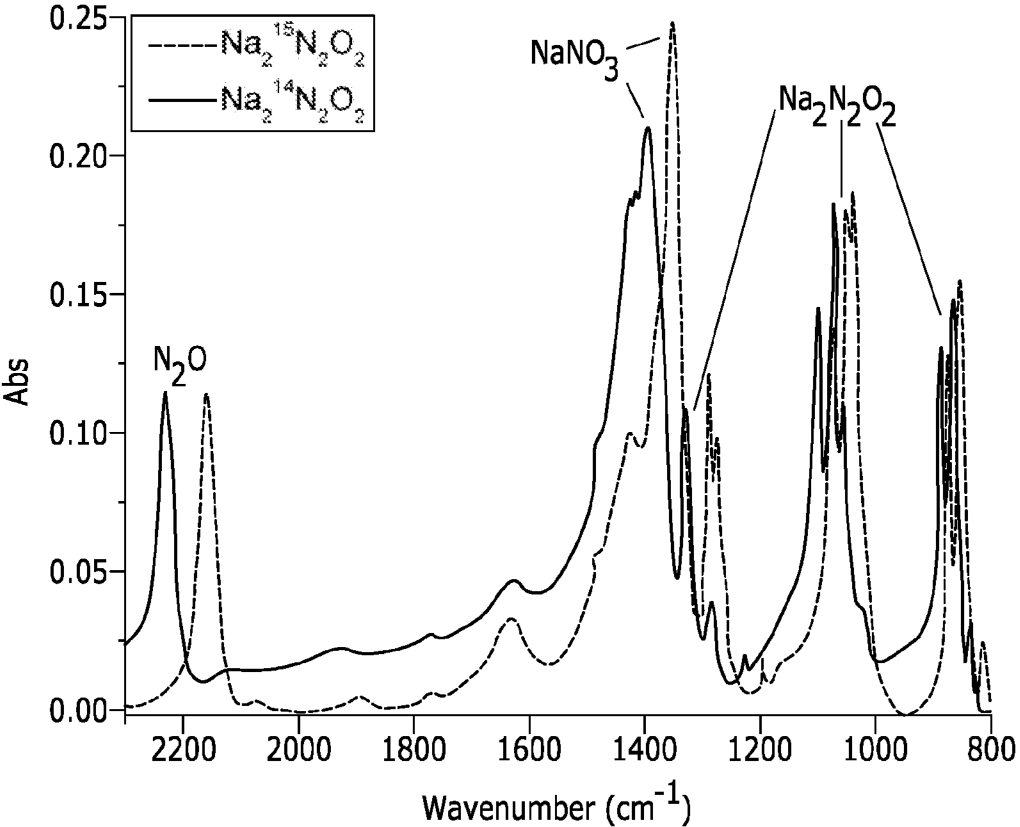
FIG. 1B shows a comparison of FTIR data for ball milling results of $Na_2O$/KBr under 3 atm $^{14}N_2O$ (red) and $^{15}N_2O$ (black). The spectra shown were obtained after ball milling (approximately 6 h).

Solid $Na_2O$ by itself was ball milled at room temperature under $N_2O$ at 1-3 atm pressure. Initial spectra taken using a diamond ATR compression cell of the product showed definitive evidence for formation of small amounts of cis-$Na_2N_2O_2$. The very moisture sensitive nature of the mixture of primarily unreacted sodium oxide and smaller amounts of cis-$Na_2N_2O_2$ always led to slow hydration and decomposition releasing $N_2O$ gas. Pellet spectra taken in KBr left no doubt that cis-$Na_2N_2O_2$ was formed. It was then decided to do the ball milling in a mixture of KBr and $Na_2O$, typically 0.5 gram $Na_2O$ mixed with 1.5 to 2.5 grams anhydrous KBr. Exposure of the mixture resulted in an increase in formation of cis-$Na_2N_2O_2$ at room temperature and this was unequivocally proven by use of isotopically labelled $^{15}N_2O$ as shown in FIGS. 1A and 1B.

Production of nitrate was proven by direct addition methods to the KBr pellet spectra and quantified by dissolution of the samples in distilled water. Ball milling of the KBr/$Na_2O$ sample matrix under $^{15}N_2O$ resulted in isotopic shifts in excellent agreement with literature values for $Na_2N_2O_2$ and $NaNO_3$ and is summarized in Table 1. Note that in all FTIR data in KBr it is not possible to assign the counterion. As such, this and other salts could be referred to as {Na, K}$N_2O_2$ but this is not done for simplicity.

TABLE 1

Tabulated peak assignments for balling milling reactions of $Na_2O$ and $^{14}N_2O$ or $^{15}N_2O$.

| Peak Assignment | $Na_2{}^{14}N_2O_2$ ($cm^{-1}$) | $Na_2{}^{15}N_2O_2$ ($cm^{-1}$) |
| --- | --- | --- |
| $N_2O$ | 2229.9 | 2158.4 |
| $NaNO_3$ | 1384.6 | 1352.4 |
| $Na_2N_2O_2$ N—O | 1330.4, 1319.9 | 1287.9, 1277.2 |
| $Na_2N_2O_2$ N═N | 1099.8, 1071.5 | 1072.0, 1043.7 |
| $Na_2N_2O_2$ N═N—O | 886.8, 855.0 | 873.8, 854.5 |

Figure 2A:
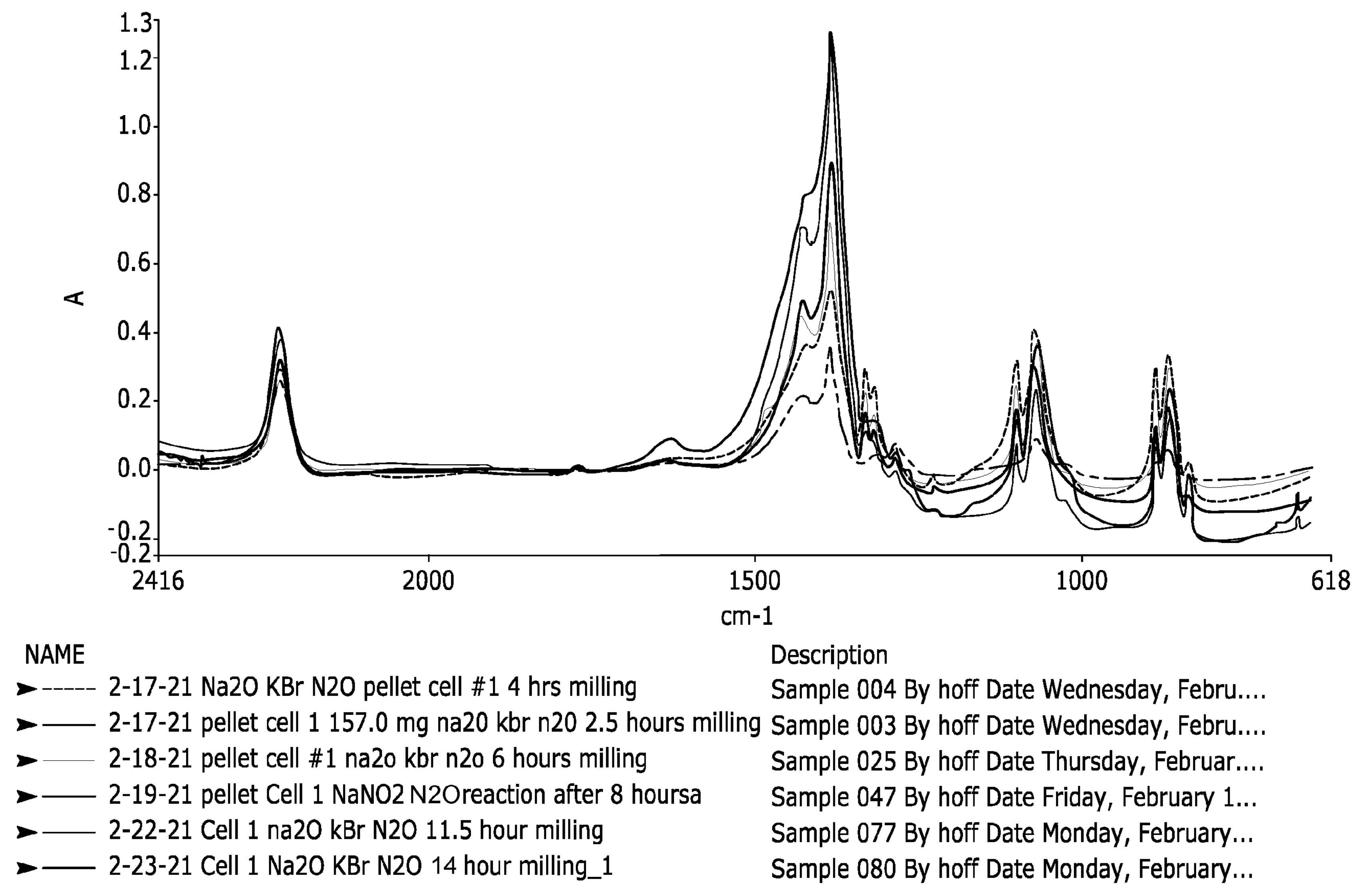
FIG. 2A shows the FTIR spectroscopic data showing formation of cis-$Na_2N_2O_2$ and $NaNO_3$ in KBr upon further milling.
Figure 2B:
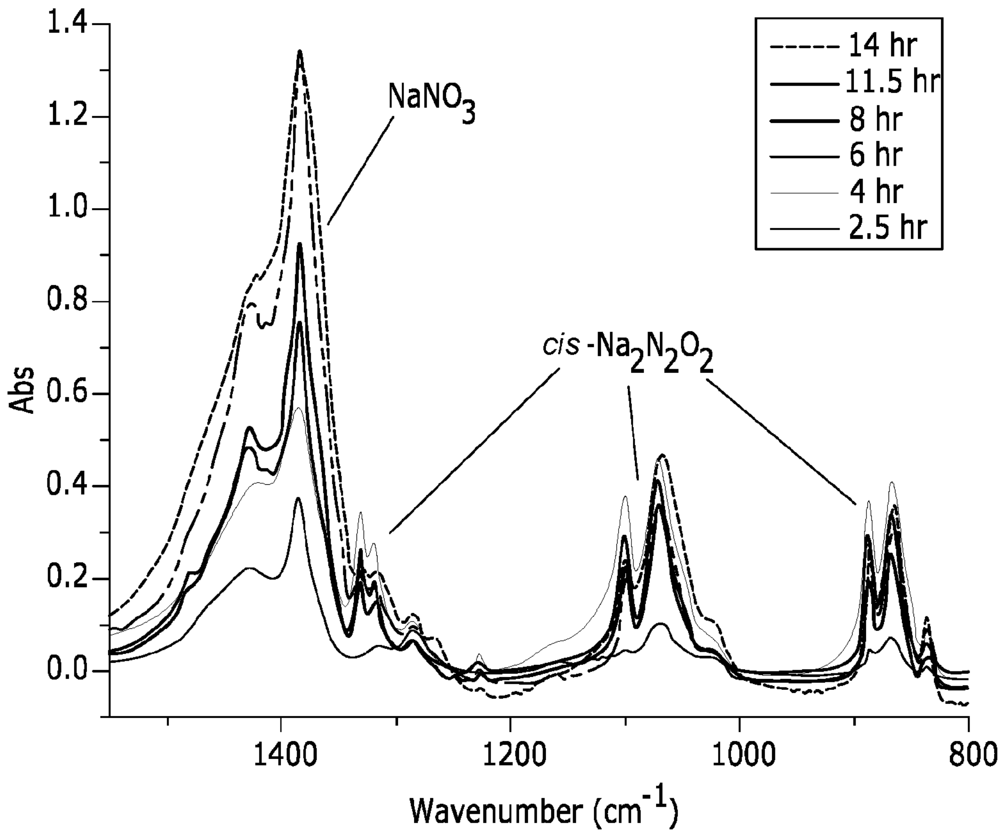
FIG. 2B shows KBr pellet FTIR spectra as a function of time for ball milling of $Na_2O$ (0.5 g) in KBr (1.5 g) under 30 psi, 2.0 ATM $N_2O$.

Continued milling of the solid led to approach of an approximately steady state peak level for cis-$Na_2N_2O_2$ but growth of peaks due to nitrate as shown in FIGS. 2A and 2B. The only source of oxygen in these reactions was nitrous oxide. The net stoichiometry of nitrate formation under these conditions corresponds to reaction (7).

(7)

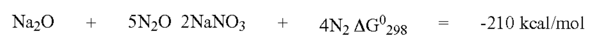

$$Na_2O + 5N_2O\ 2NaNO_3 + 4N_2\ \Delta G^0_{298} = -210\ kcal/mol$$

The band at 2228 $cm^{-1}$ is attributed to $Na_2O$ trapped within the KBr pellet. Possible sources of this are either displacement under pressure of $N_2O$ a phenomenon that has been observed with $CO_2$.

Figure 3A:
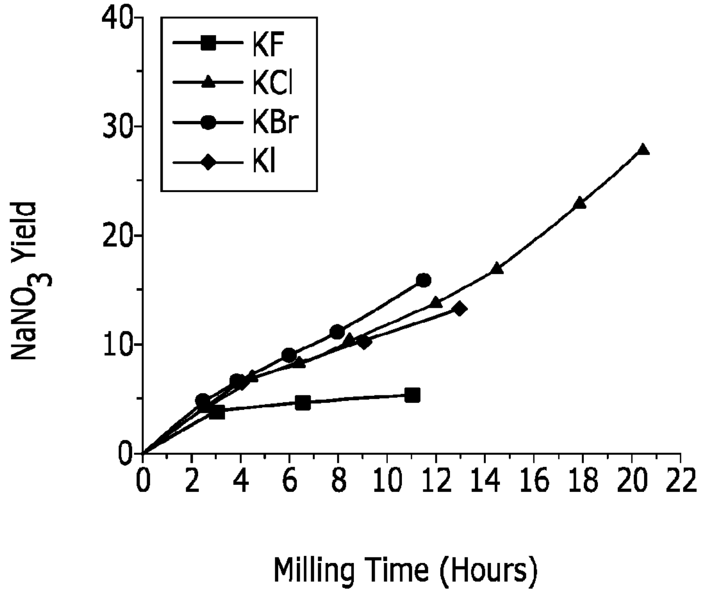
FIG. 3 shows initial rates of production of nitrate as a function of time (h) for KF, KBr, KCl, and KI.
FIG. 3B shows absorbance results under various milling times.
Figure 3B:
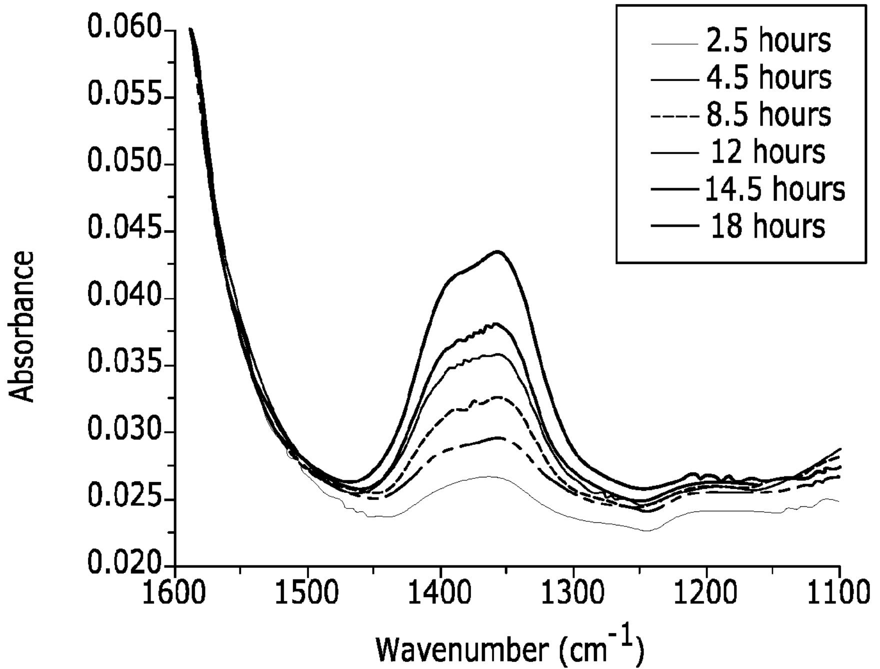

The KBr pellet data provides relative ratios of product and how they change with time, but more quantitative data were obtained by studies of hydrolysis reactions of weighed solid samples. The initial rate of nitrate production derived from aqueous ATR spectra of hydrolyzed samples as a function of time are shown for KF, KCl, KBr and KI in FIG. 3.

The rates of reaction appear to be roughly in the order KBr»KCl»KI»KF. The spectra for the KF reaction also appear to show lower amounts of cis-$Na_2N_2O_2$ than the other alkali metal halides. Ball milling the reaction and then stopping it under gas pressure did not lead to continued product buildup.

Even in the absence of added $Na_2O$, KBr alone under milling conditions was shown to lead to pellets with encapsulated nitrous oxide and these may be seen in FIG. 1 for both $^{14}N_2O$ and $^{15}N_2O$. Infrared data have been reported that indicate surface bound $N_2O$ on higher valent oxides as have others. This has been studied in the present disclosed processes, but no evidence of detectable complex formation at room temperature on the surface of a pristine KBr pellet has been identified. Encapsulated carbon dioxide has also been detected in KBr pellets, presumably from trace contamination. At present, results on ball milling of only KBr and $N_2O$ and getting a small signal of encapsulated $N_2O$ are attributed to a minor trapping which may occur as part of the ball milling procedure. Moreover, long term study of pellets containing cis-$Na_2N_2O_2$ indicate that there is a parallel decrease in bands due to hyponitrite together with an increase in bands of encapsulated nitrous oxide. Without wishing to be bound to any particular theory, it is suggested that slow migration of trace water through the pellet matrix is responsible.

In basic solution it is known that the cis-$Na_2N_2O_2$ rapidly loses $N_2O$ but that the trans isomer does this only in acidic solution. Study of both basic and acidic hydrolysis and the volume of $N_2O$ evolved as detected by gas phase FTIR studies indicates a rough reaction profile showing the time evolution of products in this reaction. A first picture of these results is shown in FIG. 4.

Figure 4:
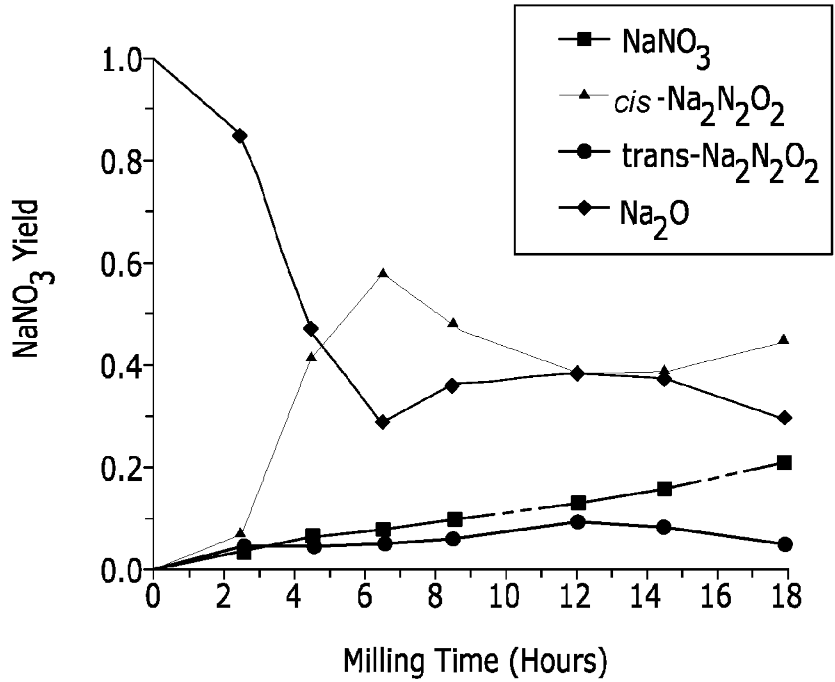
FIG. 4 shows mole fraction in total Na distribution for the first 20.5 h of ball milling 0.5 g $Na_2O$ in 1.5 g KBr.

As shown in FIG. 4 there is a slow production of $NaNO_3$ that occurs throughout the reaction. Surprisingly the $N_2O$ evolution studies showed that after an induction period of about two hours there is a fairly rapid rise in concentration of cis-$Na_2N_2O_2$ to nearly 0.6 mole fraction of all distributed sodium oxide starting material. This then decreases and remains roughly constant. The basic hydrolysis product showed consistent low levels of trans-$Na_2N_2O_2$<0.1 mole fraction present in solution. An exact match was obtained by comparison of an authentic sample. There is no evidence in the pellet FTIR data for formation in the pellet itself of trans-$Na_2N_2O_2$. Without wishing to be bound to any particular theory, it is possible this arises from the cis isomer hydrolysis but it seems more likely to the authors that it may arise from hydrolysis of an unidentified intermediate material. It should also be added that iodometric titration for the presence of peroxide in the solution shows levels less than»4% in these reactions. In most cases there are no signs of significant Fe concentration in the salt matrix or corrosion of the mixing chamber. In the presence of not sufficiently dry material, the presence of moisture has led to some corrosion and detection of Fe in the salt matrix. The role of trace Fe catalysis of the oxidation cannot be excluded, but provided all materials are rigorously dry there is no significant evidence for that.

The reaction at room temperature of pure $Na_2O$ does not proceed at a significant rate. Without wishing to be bound to any particular theory, the reaction of $CO_2$ under these conditions is virtually instantaneous in keeping with the generally faster rate of reaction of O═C═O where nucleophilic attack on the central carbon leads directly to product. In contrast, migration to the terminal N of N═N═O appears to present a larger barrier. This occurs in the binding of NHC's as discovered by Severin and in keeping with known computational studies.

The reaction does not occur in the absence of ball milling, there is no sign of extensive corrosion of the ball milling jar. The apparently beneficial effect of salt with respect to the chemistry and photochemistry of nitrogen oxides has been studied by Grassian, and other atmospheric scientists, and there are reports in organic and inorganic literature in this regard. Without wishing to be bound to any particular theory, with respect to ball milling, the apparent effect of salt addition to $Na_2O$ may be related to mechanical action favoring formation of a mixed lattice. There is literature precedent for this type of possibility. It is clear that $Na_2O$ has a high lattice energy which needs to be overcome. Calorimetric studies of the enthalpy of displacement of nitrous oxide in cis-$Na_2N_2O_2$ by carbon dioxide to form $Na_2CO_3$ will give insight into the experimental reaction energetics.

It is interesting to note that a roughly steady state concentration of cis-$Na_2N_2O_2$ during the production of nitrate. This implies that following buildup of cis-$Na_2N_2O_2$, the rate of its formation as well as the rate of its oxidation may be roughly equal. So far the reaction has not been studied in the presence of added oxygen, and the only source of oxygen is $N_2O$ itself. This may imply that a common activated intermediate may be formed under mixing conditions which may activate $N_2O$ towards reaction with either $Na_2O$ or $Na_2O_2$. Without wishing to be bound to any particular theory, a possible explanation is the formation of a trapped salt complex. It is believed that it is unlikely that anything corresponding to NaONa(g) would be formed with a long enough lifetime to interact directly with $N_2O$. Nevertheless we have computed what that reaction profile would look like. A simple computed mechanism is shown in FIGS. 5A and 5B.

Figure 5A:
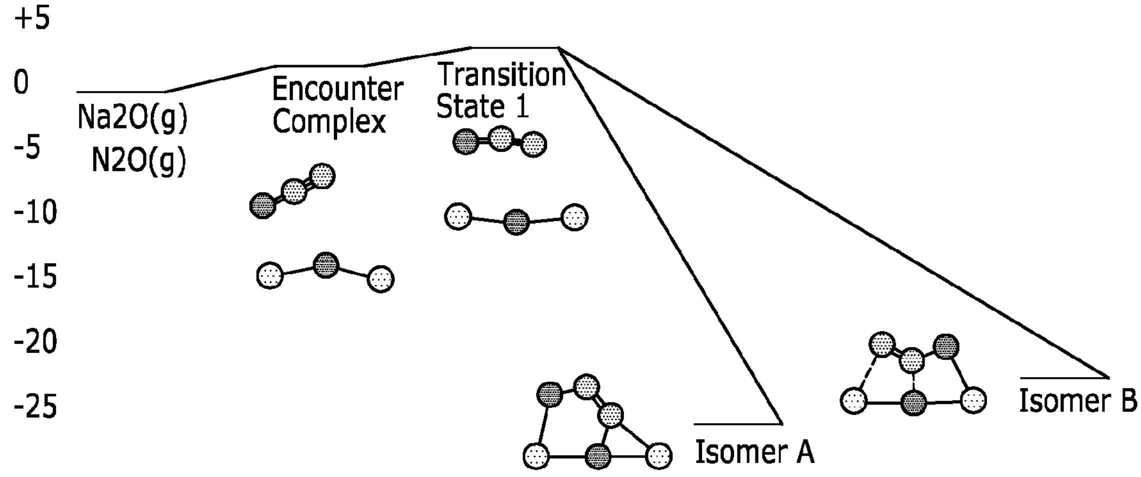
FIG. 5A shows computed values $\Delta G_{298}$ (kcal/mol) for reaction of $Na_2O$ and $N_2O$ in the gas phase.
Figure 5B:
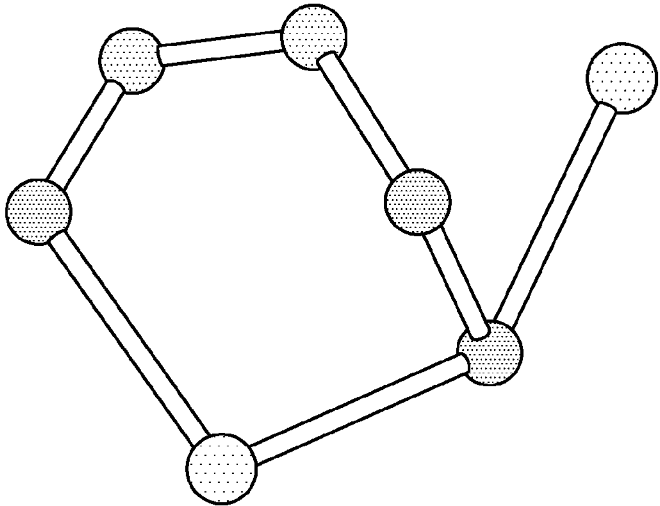
FIG. 5B shows a computed structure of intermediate adduct formed in reaction of $Na_2O$ and $N_2$.

FIG. 5A shows the reaction proceeds by initial exothermic formation of an encounter complex (ΔG298 +1, ΔH −7.5) which passes through a low lying transition state ((ΔG298 +2.5, ΔH −6.5) to form a more stable isomer A (ΔG298 −22.5, ΔG −33) with a less stable isomer B (ΔG298 −20, ΔH −26) and the reaction would be expected to occur at a very fast rate in the gas phase. It should be pointed out that this is in contrast to the reaction of NHC ligands with N═N═O where enthalpies of activation on the range of 15 kcal/mole and higher exist. FIG. 5B shows a computed structure of an intermediate adduct formed in the reaction.

The computed mechanism does not take into account any type of lattice involvement. It does illustrate a remarkably low estimate for the multipoint attack of Na—O—Na on N═N═O. It implies that if the mixer mill action could rapidly generate these "naked fragments" they would rapidly react. This is in contrast to computational barrier for NHC addition and migration which is much higher. It provides some hope that adjustment of conditions may lead to improvement in rate and yield. At present, maximum yields of nitrate produced based on sodium oxide reactant go fairly smoothly to approximately 50% and then taper off. Without wishing to be bound to any particular theory, it is believed that that the presence of alkali metal halides may be linked to formation not of naked $Na_2O$ but of a salt solvated form which has some mobility and also affinity for nitrous oxide. In spite of a relatively slow rate of conversion and only moderate yields, this represents the first conversion of nitrous oxide to nitrate at low temperatures (35 to 42° C. on average) and 30 psi, 3 atm absolute pressure of $N_2O$. It proceeds through formation of cis-$Na_2N_2O_2$ which may now be conveniently studied in a KBr matrix for its reactions and for additional oxidation methods.

In some embodiments, nitrous oxide is oxidized in the presence of sodium oxide to produce sodium nitrate. This is done in the presence of catalysts and also uses mechanical chemical activation (e.g., by ball milling) the solid reagents under gas pressure.

In some embodiments, the nitrogen oxide is selected from the group consisting nitric oxide (NO), nitrogen dioxide ($NO_2$) nitrogen trioxide ($NO_3$), nitrous oxide ($N_2O$), dinitrogen dioxide ($N_2O_2$), dinitrogen trioxide ($N_2O_3$), dinitrogen tetroxide ($N_2O_4$), dinitrogen pentoxide ($N_2O_5$), nitrosylazide ($N_4O$), oxatetrazole ($N_4O$), trinitramide ($N_4O_6$), and a combination thereof. In some embodiments, the nitrogen oxide comprises nitrous oxide.

In some embodiments, the nitrogen oxide is a mixture. By way of example, in some embodiments, the mixture is a mixture of nitrous oxide and other nitrogen oxides.

In some embodiments, the milling conditions further comprising milling in the presence of oxygen gas ($O_2$). In these embodiments, the milling can be conducted in an atmosphere that is a mixture of the nitrogen oxide and oxygen (e.g., 1:2 parts $N_2O$:$O_2$ by volume). Alternatively, the milling also can be conducted wherein the nitrogen dioxide and oxygen are each introduced into the system in alternating sequences. For example, the milling can be conducted for a time period in the presence of nitrogen oxide, then the nitrogen oxide is evacuated, and oxygen gas is introduced into the system. Without wishing to be bound to any particular theory, the binding of $N_2O$ to suitably prepared salt mixtures of metal oxides is faster than any subsequent oxidation. High conversion of dispersed metal oxides to approximately 90% in 1 h ball milling may be achieved. During this time period oxidation by nitrous oxide of the cis-hyponitrite salt to nitrite and nitrate salts is slow compared to the rapid rate of binding.

The binding of suitably prepared salts in which $Na_2O$ or $K_2O$ in a salt matrix that has been ball milled occurs rapidly upon gas contact, and within 1 to 2 hours ball milling time is nearly complete based on FTIR data. The rate of oxidation of this product by ball milling under $N_2O$ is much slower than the rate of binding. The rate of oxidation of this product by ball milling with $Na_2O_2$ is also slower. The rate of oxidation by $O_2$ gas occurs in 1-3 hours ball milling. A mixture of nitrite and nitrate product is formed in yields of approximately 90% in this time under suitable milling conditions at ambient temperature and pressures of 30 pounds per square inch pressure of pure $O_2$.

It is known that KCl and $Na_2O$ and $K_2O$ can form antiperovskite structures of formula $M_3O_X$, wherein x X is Cl, Br, I, $NO_2$ or other small anion. Under active conditions of ball milling these or a disordered form of them or other as yet unknown structure appear to play a role in the catalytic oxidation.

For simplicity of illustration "$Na_3OCl$" is used but materials containing K instead of Na, and also containing various K and Na mixtures in different ratios may be used. Anions other than chloride have been tested but in actual usage, due to the need for agricultural compatibility, bromide, nitrite, and superoxide anions have also been tested.

For simplicity of illustration "$Na_3OCl$" is used herein but materials containing K instead of Na, and also containing various K and Na mixtures in different ratios may be used. Chloride is contemplated, as well as other anions such as bromide, nitrite, and superoxide anions.

The initial step in oxidation of $N_2O$ starting with "$Na_3OCl$" is binding of $N_2O$ to form the cis hyponitrite cis-$Na_2N_2O_2$. This reaction is rapid and only small amounts of nitrite and nitrate are produced under the $N_2O$ atmosphere. It is sufficiently fast initially that a negative pressure in the reactor is formed and essentially all the $N_2O$ present is bound in less than thirty minutes and the reactor needs to be refilled with $N_2O$. If $Na_2O$ is present in excess, the rate of binding of over 95% of the $N_2O$ may be achieved within about a half hour. Without wishing to be bound by any particular theory it is possible that this involves rapid binding of initially exposed sites very rapidly followed by a slower exposure of buried sites due to the destructive impact that occurs during the ball milling process.

Once formed, cis-$Na_2N_2O_2$ contained within the salt matrix reacts slowly when ball milling is done under an atmosphere of $N_2O$ over a period of hours to form a mixture of sodium nitrite and sodium nitrate. The initial product formed is primarily nitrate with a smaller amount of nitrite being detected.

Once formed, cis-$Na_2N_2O_2$ contained within the salt matrix reacts more rapidly when ball milling is done under an atmosphere of $O_2$, for example, within 1-3 hours forming a nearly equal mixture of sodium nitrite and sodium nitrate. A plausible scenario for this reaction is a two step process in which $Na_2N_2O_2$ reacts with $O_2$ to form 2 $NaNO_2$ in the first step.

In a second step, which is also rapid, $NaNO_2$ is oxidized further to $NaNO_3$. A complex ratio exists with an initial large portion of the reaction channel producing nitrate and then later nitrite. Combined yields of nitrate and nitrite approaching 90% may be achieved in this method.

The further oxidation of nitrite obtained in the mixture described can be achieved; however, it requires the addition of more $Na_2O$. This oxidation follows the net stoichiometry $NaNO_2+Na_2O+O_2 \rightarrow Na_2O_2+NaNO_3$.

In an aspect, the disclosed processes provide oxidation of $NaNO_2$ to $NaNO_3$ under ball milling and as a function of the salt mixture used. The ability to oxidize in the solid state using $O_2$ and ball milling at ambient temperatures has never been reported to our knowledge. Even in solution such nitrite to nitrate oxidations are typically performed at temperatures of 100 to 400° C. The anti-perovskite structure formed in the reaction of $Na_2O$ and $NaNO_2$ consists of an $Na_3O(+)$ cage with an $NO_2(-)$ anion trapped in its interior. The oxidation of $NaNO_2$ in KCl alone is not rapid under identical conditions. The oxidation of $NaNO_2$ in a mixture of $Na_2O$ and KCl is rapid under typical conditions. Surprisingly, the oxidation of $Na_2O$ which has been ball milled together with $NaNO_2$ is also facile without the presence of added KCl. Without wishing to be bound by any one theory it is believed that the anti-perovskite structure presents an active reaction channel for $O_2$ binding and activation.

When prepared in advance by milling $Na_2O$ and KCl together, $N_2O$ binds rapidly and in near quantitative yield in 2-4 hours producing cis-$Na_2N_2O_2$ in the salt matrix with very little oxidation. The reduction in pressure goes from 3 atm absolute pressure to approximately 0.3 atm absolute pressure, indicating roughly 90% binding of the first loading of nitrous oxide into the reactor. Addition of more nitrous oxide also results in rapid uptake provided sodium oxide is present in excess. Infrared spectral data show this to be almost exclusively cis-$Na_2N_2O_2$ with very little formation of nitrate.

The complete oxidation of cis-$Na_2N_2O_2$ to $NaNO_3$ by $O_2$ can be achieved in the presence of excess $Na_2O$ but it also produces an equivalent of $Na_2O_2$. The $Na_2O_2$ so produced can be however further oxidized by addition of 2 $\cdot NO_2$ gas which quantitatively produces 2 $NaNO_3$.

This suggests that the final product of oxidation of $N_2O$ to $NaNO_3$ by $O_2$ and excess $Na_2O$ will contain significant amounts of $Na_2O_2$. This can be, however, readily converted by passing the initial gas stream input through the salt matrix. Even in the absence of special gas mixing this reaction appears to be rapid. The utilization of aerosol oxidation techniques, possibly augmented by photochemical or electrochemical methods, may be used to drive the reaction to completion.

The salt matrix so formed may also utilize compounds of S, P, Ca, Fe, Cu, Mo, Zn and other essential plant nutrients. This would most likely be in the form of $Na_2SO_4$, $Na_3PO_4$, $Fe(NO_3)_2$, $Cu(NO_3)_2$, $Na_2MoO_4$, ZnO, CaO or $CaO_2$. It is not expected that this will alter the established reaction pattern but may advantageously accelerate or catalyze some of the reactions. For example, anhydrous $CaSO_4$ (gypsum, drierite) may be used to finish dehydration of the exhaust stream that contains the nitrogen oxides and then later combined with the final product in a single blended fertilizer.

The metal oxide can be any suitable metal oxide. In some embodiments, the metal oxide comprises an alkali metal oxide. In some embodiments, in conjunction with other above or below embodiments, the alkali metal oxide is selected from the group consisting of sodium oxide ($Na_2O$), sodium peroxide ($Na_2O_2$), lithium peroxide ($Li_2O_2$), potassium oxide ($K_2O$), and a combination thereof. In some embodiments, the alkali metal oxide is selected from the group consisting of sodium oxide, sodium peroxide, and a combination thereof.

The disclosed processes comprise milling conditions. In some embodiments, the milling conditions comprise or is ball milling. An illustrative mill is the mixer mill MM500 nano commercially available from Retsch GmbH. In some embodiments, means other than ball milling can be used for mechanical or electrical activation (e.g., planetary ball mill, twin screw extruder, impact milling, sheering milling, as well as electric spark or photochemical activation during milling may be used).

In keeping with aspects of the disclosed processes, an alkali metal hyponitrite is formed upon contacting the nitrogen oxide with the alkali metal oxide. In some embodiments, the alkali metal hyponitrite is sodium hyponitrite ($Na_2N_2O_2$). In some embodiments, in conjunction with other above or below embodiments, the sodium hyponitrite is cis-sodium hyponitrite.

In various embodiments, the disclosed processes further comprise a catalyst. In some embodiments, in conjunction with other above or below embodiments, the nitrogen oxide with the metal oxide in the presence of a catalyst. In some embodiments, the catalyst comprises or is a metal halide salt (e.g., a potassium halide). Suitable potassium halides include, for example, potassium bromide, potassium chloride, potassium iodide, and a combination thereof. In some embodiments, the catalyst comprises iron. Without wishing to be bound to any particular theory, it is believed that iron from a steel reaction vessel can act as a catalyst.

In some embodiments, the disclosed processes are conducted in a suitable solvent. Illustrative suitable solvents include, for example, a liquid nitrate salt (e.g., alkali metal nitrate salt). In some embodiments the alkali metal nitrate salt is selected from the group consisting lithium nitrate, sodium nitrate, potassium nitrate, and a combination thereof.

In keeping with aspects of the disclosure, the disclosed processes are conducted at a suitable temperature. In some embodiments, the processes comprise contacting the nitrogen oxide with the metal oxide at a temperature of less than 360° C. (e.g., 355, 350, 340, 330, 320, 310, 300, 290, 280, 270, 260, 250, 240, 230, 220, 210, 200, 190, 180, 170, 160, 150, 140, 130, 120, 110, 100, 90, 80, 70, 60, 50, 40, 35, 30, 25, 23, or 20° C. or less). In some embodiments, the temperature is 150° C. or less. In some embodiments, the temperature is 38° C. In some embodiments, the temperature is 35° C. or less. In some embodiments, the temperature is 25° C. or less.

In keeping with aspects of the disclosure, the disclosed processes are conducted at a suitable pressure. In some embodiments, in conjunction with other above or below embodiments, the process comprises contacting the nitrogen oxide with the metal oxide at ambient pressure.

The present disclosure provides a route that can be applied practically to the later stages of oxidation of $N_xO_y$. In some embodiments, the disclosed method utilizes $N_2$ as a feedstock. In some embodiments, the complex cis-$Na_2N_2O_2$ may be prepared by ball milling $Na_2O$ in KBr under an atmosphere of $N_2O$ at ambient temperature. The complex is unequivocally proven by its FTIR spectrum as well as that of $Na_2{}^{15}N_2O_2$ obtained by ball milling under $^{15}N_2O$ atmosphere which is in exact agreement with data from its synthesis at a temperature of 360° C. over 2 hours. The complex builds up to an approximate steady state concentration over time as it is converted slowly to $Na(K)NO_3$. The reaction yields based on initial $Na_2O$ are on the order of 15% after 8 hours of ball milling, and approach approximately 50% conversion over longer periods. Slow hydrolysis of cis-$Na_2N_2O_2$ in a KBr pellet produces NaOH and spectral bands attributed to weakly bound $N_2O$ encapsulated in the KBr matrix. Computational data on the possible interaction of KBr and $N_2O$ support formation of a weak interaction which may be instrumental in activation of nitrous oxide.

As described herein, the processes disclosed herein advantageously provide a new route to conversion at low temperatures and low pressures using mechanical chemical activation of salts to trap and oxidize $NO_x$ and $N_2O$ to nitrate. This is achieved using a matrix containing compounds which are compatible with fertilizer use and which may be subsequently blended and used without purification. For example, in some embodiments the materials and components used in the disclosed processes are compatible with a fertilizer (e.g., NPK fertilizer) and can contain one or more of the following nutrients: ammonia, chitosan, clays (e.g., bentonite, gypsum, clinoptilolite), inorganic salts (e.g., calcium containing salts, phosphorous containing salts), and trace metals (e.g., Na, K, Cl, P, Ca, O, S, Mo, Fe, Zn, Cu, Si, Br, Cs, Ba, or a combination thereof). The nature of the blended mixture can be advantageously tuned to match the desire application (e.g., to best suit the needs of the crop and soil).

The disclosed processes are advantageous in an agricultural setting wherein handling of liquid ammonia is often done. The use of liquid ammonia on a farm as a source of electricity to power farm equipment and also to transmit to local towns for use may be achieved using the processes disclosed herein. Further, the mechanical and electrical energy needed (e.g., for ball-milling or other grinding processes) may be obtained from windmill and solar energy sources. The direct use of wind or water energy to mill grain can eliminate conversion to electrical energy. There are a number of advantages to this system including that the fertilizer components are produced from waste gases in a low population density area where the product may be used with minimal transportation.

Figure 15:
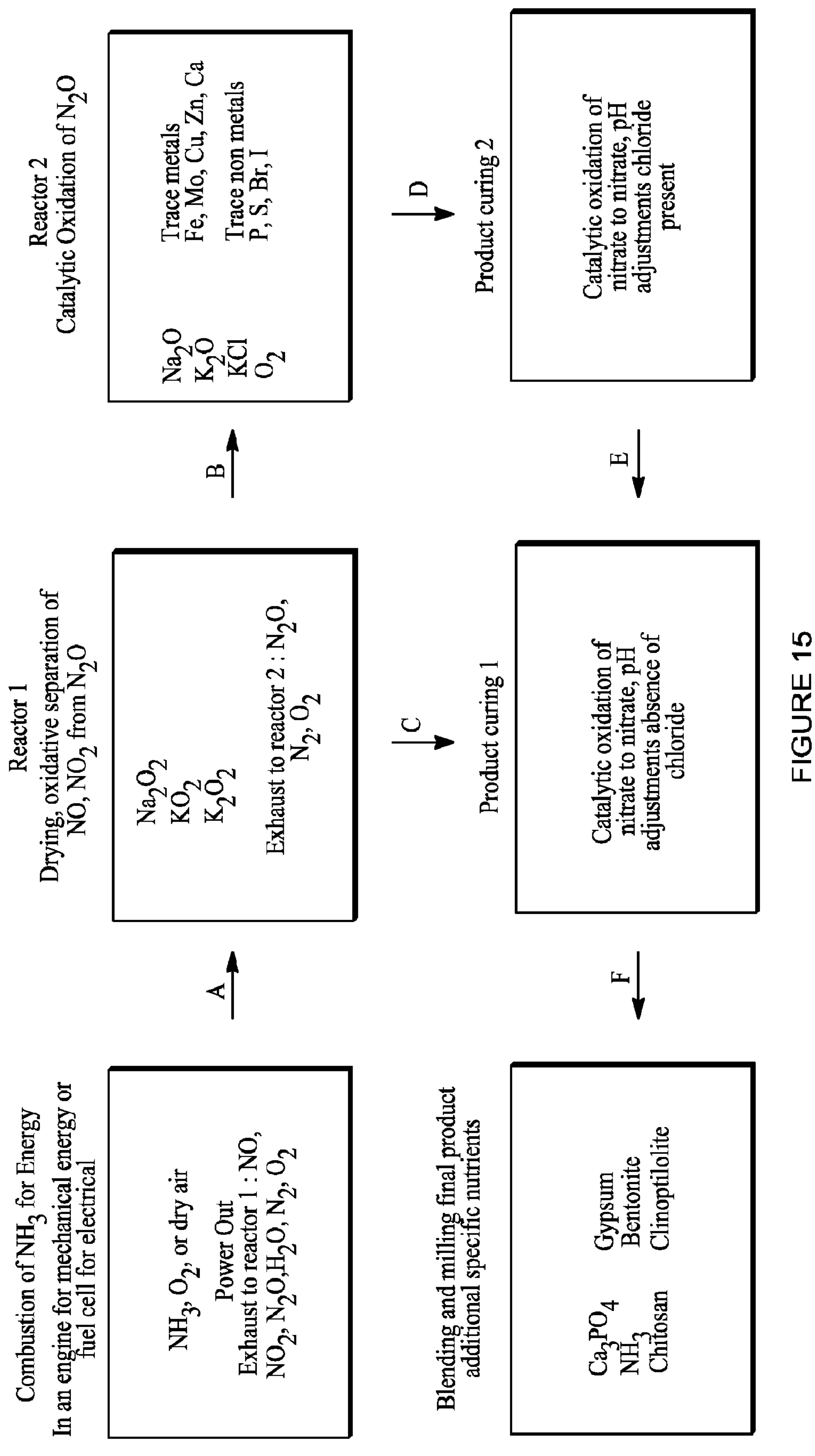
FIG. 15 shows a sequence of reactions in accordance with embodiments of the disclosed processes.

In some embodiments, a gas comprising $N_2O$ and ·NO and ·$NO_2$ can be obtained using a series of metal oxide mixtures to remove and oxidize first ·NO and ·$NO_2$ leaving essentially pure $N_2O$ which is treated in the reactions disclosed herein. The sequencing and components used in the combined treatment process also represent a new method of dealing with $N_2O$ and ·NO and ·$NO_2$ produced in a process wherein ammonia is burned or where nitrous oxide is produced. An illustrative embodiment is illustrated in the block diagram presented in FIG. 15 showing a sequence of reactions wherein raw materials are activated, reacted and blended to yield product.

EMBODIMENTS

1. A process for preparing a nitrate comprising contacting a nitrogen oxide with a metal oxide under milling conditions to form a nitrate.
2. The process of embodiment 1, wherein the nitrogen oxide is selected from the group consisting nitric oxide (NO), nitrogen dioxide ($NO_2$) nitrogen trioxide ($NO_3$), nitrous oxide ($N_2O$), dinitrogen dioxide ($N_2O_2$), dinitrogen trioxide ($N_2O_3$), dinitrogen tetroxide ($N_2O_4$), dinitrogen pentoxide ($N_2O_5$), nitrosylazide ($N_4O$), oxatetrazole ($N_4O$), trinitramide ($N_4O_6$), and a combination thereof.
3. The process of embodiment 1, wherein the nitrogen oxide comprises nitrous oxide.
4. The process of any one of embodiments 1-3, wherein the metal oxide comprises an alkali metal oxide.
5. The process of embodiment 4, wherein the alkali metal oxide is selected from the group consisting of sodium oxide ($Na_2O$), sodium peroxide ($Na_2O_2$), lithium peroxide ($Li_2O_2$), potassium oxide ($K_2O$), and a combination thereof.
6. The process of embodiment 5, wherein the alkali metal oxide is selected from the group consisting of sodium oxide, sodium peroxide, and a combination thereof.
7. The process of any one of embodiments 1-6, wherein the milling conditions is ball milling.
8. The process of any one of embodiments 4-7, wherein an alkali metal hyponitrite is formed upon contacting the nitrogen oxide with the alkali metal oxide.
9. The process of embodiment 8, wherein the alkali metal hyponitrite is sodium hyponitrite ($Na_2N_2O_2$).
10. The process of embodiment 9, wherein the sodium hyponitrite is cis-sodium hyponitrite.
11. The process of any one of embodiments 1-10, further comprising contacting the nitrogen oxide with the metal oxide in the presence of a catalyst.
12. The process of embodiment 11, wherein the catalyst comprises a metal halide salt.
13. The process of embodiment 12, wherein the metal halide salt comprises a potassium halide.
14. The process of embodiment 13, wherein the potassium halide comprises potassium bromide.
15. The process of any one of embodiments 1-14, further comprising contacting the nitrogen oxide with the metal oxide in the presence of a solvent.
16. The process of embodiment 15, wherein the solvent comprises a liquid nitrate salt.
17. The process of embodiment 16, wherein the liquid nitrate salt comprises an alkali metal nitrate salt.
18. The process of embodiment 17, wherein the alkali metal nitrate salt is selected from the group consisting lithium nitrate, sodium nitrate, potassium nitrate, and a combination thereof.
19. The process of any one of embodiments 1-18, further comprising contacting the nitrogen oxide with the metal oxide at a temperature of 300° C. or less.

20. The process of embodiment 19, wherein the temperature is 150° C. or less.
21. The process of embodiment 19, wherein the temperature is 35° C. or less.
22. The process of embodiment 19, wherein the temperature is 25° C. or less.
23. The process of any one of embodiments 1-22, further comprising contacting the nitrogen oxide with the metal oxide at ambient pressure.
24. The process of any one of embodiments 1-23, wherein the milling conditions comprise milling in the presence of oxygen gas.
25. The process of embodiment 24, wherein the nitrogen oxide is nitrous oxide.
26. The process of embodiment 25, wherein the ratio of nitrous oxide to oxygen is about 1:2 by volume.
27. The process of embodiment 24, wherein the nitrogen oxide and oxygen gas are introduced in alternating sequences.

EXAMPLES

The following examples further illustrate the disclosed processes, but of course, should not be construed as in any way limiting their scope.

General: All manipulations were performed in a vacuum/atmospheres glove box equipped with a Braun gas purifier system. Open trays of indicating drierite were kept along the back of the glove box to reduce moisture content. Nitrous oxide, oxygen, and other gases used were obtained from Airgas, of research grade, and used as received. Isotopically labelled $^{15}N_2O$ was obtained from Cambridge Isotopes and was 99% $^{15}N$ and used as received. KF, KBr, KCl, KI salts were obtained from commercial vendor and were ACS certified purity. Salts were typically dried in an oven at 250° C. in an oven for several hours and then taken into the glove box and stored in sealed dry containers. Mixer mill experiments were performed in a RETSCH mm500 mixer mill in a 50 mL stainless steel grinding jar with a top with two ports for gas addition/evacuation. Infrared data were obtained on a Perkin Elmer Frontier FTIR spectrophotometer with MCT detector and ATR Diamond Cell Accessory. Gas Phase FTIR were obtained in a 10 cm International Crystal Laboratories glass cell with two stopcocks and equipped with either NaCl or $CaF_2$ windows. Typical procedures are described below.

Example 1A—Representative Ball Milling Experiment

The top and bottom and mixer cell pieces for the RETSCH mm500 cell were heated in an oven to 145° C. or in some cases 220° C. for several hours. Rubber o-ring and gasket materials were heated in a lower temperature oven at 85° C. These are all placed on trays in the oven, and the trays were taken quickly to the antechamber of the glove box and evacuated and filled with dry argon or nitrogen three times. Sufficient time was allowed for them to cool down to room temperature prior to their handling in the glove box. A 0.50 gram sample of $Na_2O$ (which was not dried but used directly as received) was weighed quickly into the bottom half of the mixing jar. Following that a 1.50 gram sample of KCl (which had been dried at 250° C. in an oven and kept stored in the glove box) was weighed onto that. One 25 mm stainless steel ball was added to the 50 mL mixing jar, the jar was sealed and tightened in the glove box. It was then taken to the mixer mill and loaded into one of the two arms. The cell was evacuated and filled with $N_2O$ in three cycles, and then filled with 30 psi (about 2 atm pressure above atmospheric, 3 atm absolute pressure) $N_2O$. The main tank valve to the $N_2O$ was then closed. This allowed the manifold and fitting and mixing jar to be under a near constant pressure since it could be replenished by a limited amount of gas on the high pressure side of the manifold and the main tank valve of the gas cylinder. A typical single cycle was to run for 5 minutes mixing at 30 Hz, then a rest period cycle of 2 minutes. A set of 12 of these cycles provides one hour of active mixing with 12 minutes of rest. This keeps the temperature of the mixing jar between ambient room temperature of 22° C. and a maximum mixing temperature of 38±4° C. at the end of a 5 minute mixing cycle. The cooling down period is important. RETSCH recommends that a roughly even blend of empty space in the mixer mill, volume of mixing balls, and volume of material placed in the grinding jar. The short cycle time used with a rest period did not result in the authors view in any damage to the mixing jar. This ratio of solids and of active mixing to resting time was arrived at only after careful monitoring of test conditions. In view of the potentially hazardous conditions, appropriate safety measures were taken during these operations. Following one hour of milling the mill automatically stops. At that time the mixing jar is evacuated and taken from the mixer mill to the glove box for withdrawal of a sample for analysis. Inhalation of any powders is to be avoided and suitable protective equipment and procedures were followed. Samples were taken into the glove box and analyzed as described herein.

Example 1B—Ball Milling of $Na_2O$ in KBr Under $N_2O$ Pressure

A RETSCH mixing vessel, 50 mL volume and one 25 mm mixing ball were dried in an oven at 150° C. on a metal tray. In a separate oven the o-rings were dried at 85° C. for several hours. These were taken while still hot to the vacuum ante-chamber. The mixing vessel was loaded with 1.5 grams KBr that had been pre-dried (250° C.) as well as 0.5 grams of $Na_2O$ which was not dried, but was used as obtained from Alfa Inorganics from a fresh bottle avoiding the use of surface material. The cell was closed and taken out of the glove box and loaded into the mixer mill. A Schlenk manifold via butyl rubber tubing to allow evacuation and filling of the cell. The cell was evacuated twice and filled with a pressure of 35 psi pressure, yielding an absolute pressure of approximately 3 atm $N_2O$ in the cell. The cell was run on a programmed cycle of 90 seconds active mixing at 30 Hz followed by resting for 120 seconds to prevent over heating. The temperature of the cell was measured by both thermal scan and direct contact probes and found to be typically 30-32° C. during active operation. The temperature was never observed to exceed 35° C. Typically a series of 10 to 20 intervals of a mixing cycle were used, and a sample withdrawn for analysis by FTIR at that time. The mixing cell was removed from the RETSCH sample holder, evacuated to remove nitrous oxide, and taken to the glove box antechamber. After three vacuum/argon cycles the cell was taken into the glove box. Samples were removed for analysis, the mixing vessel closed and taken out of the glove box for additional active mixing. On several occasions the mixing vessel was left overnight under an $N_2O$ atmosphere to see if reaction would occur under static conditions, and negligible changes in spectra of the solid were observed.

FTIR Data Collection of Solid Samples. Three primary methods for sampling the solid were utilized.

A. ATR of the solid. In order to obtain quantitative data for the concentrations of nitrate and also trans hyponitrite in solution ATR studies were performed in which a weighed sample of about 150 mg was dissolved into 1 mL of distilled water. Considerable evolution of $N_2O$ occurred during this time as indicated by the FTIR analysis.

Typically, the solid was taken in a special holder to the PE Diamond attenuated total reflectance (ATR) accessory and under dry conditions loaded and a spectrum taken. Due to the very hydroscopic nature of the sodium oxide/potassium bromide milled mixture deterioration of the product from atmospheric moisture or in some cases carbon dioxide was observed. However initial spectra were found to give good qualitative results in agreement with pellet and solution studies.

Figure 6A:
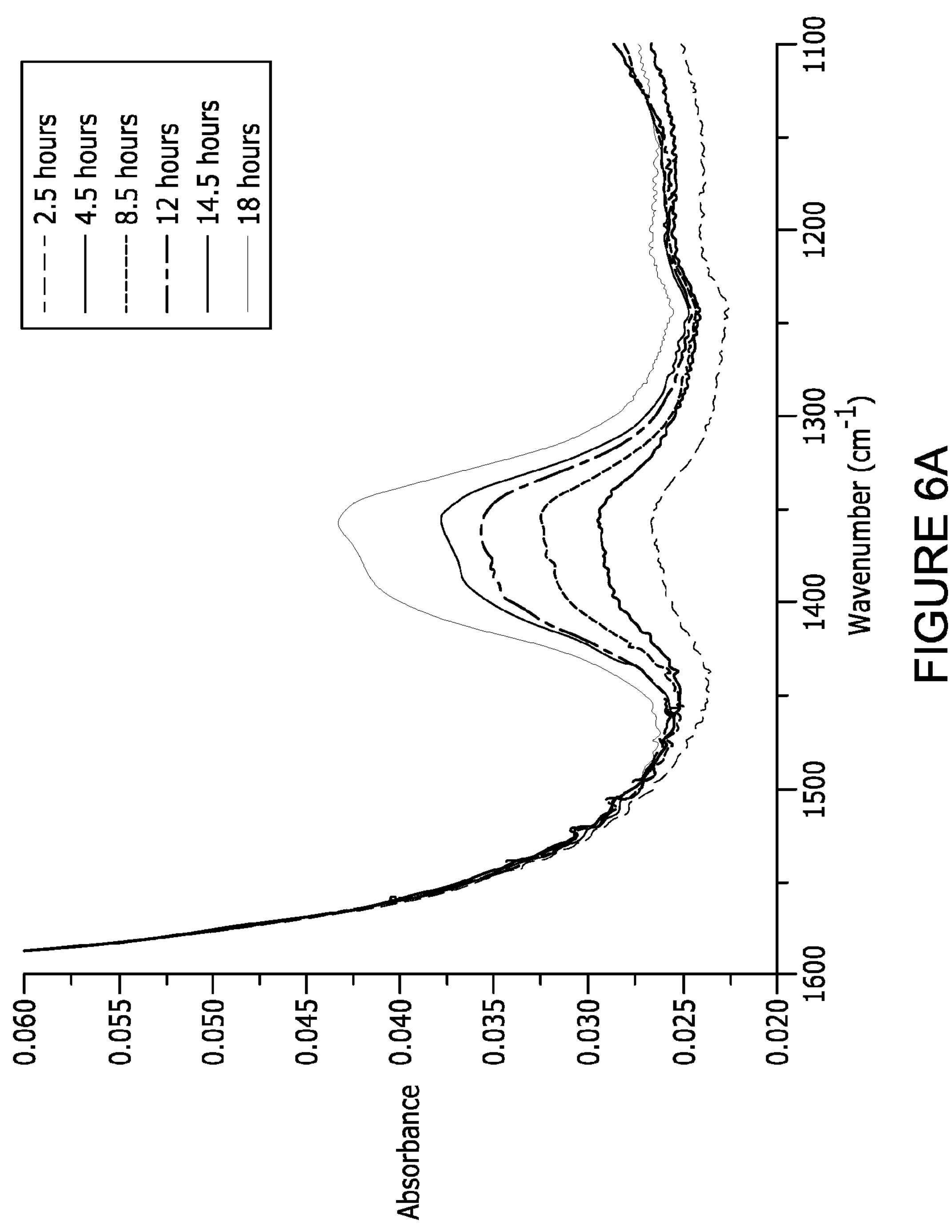
FIG. 6A shows FTIR data of aquation product showing band due to nitrate near 1384 $cm^{-1}$.

B. Aqueous solution phase studies. In order to obtain reasonable quantitative data, particularly for nitrate and nitrite concentrations, a weighed sample of the mixer mill product was transferred to a 1 mL vial, and either $H_2O$ or $D_2O$ added to it and the FTIR spectrum run on the PE Diamond ATR. See FIG. 6A. The band near 1384 $cm^{-1}$ was assigned to nitrate. Calibration curves were shown to be linear in both nitrate and nitrite using standard techniques.

Figure 6B:
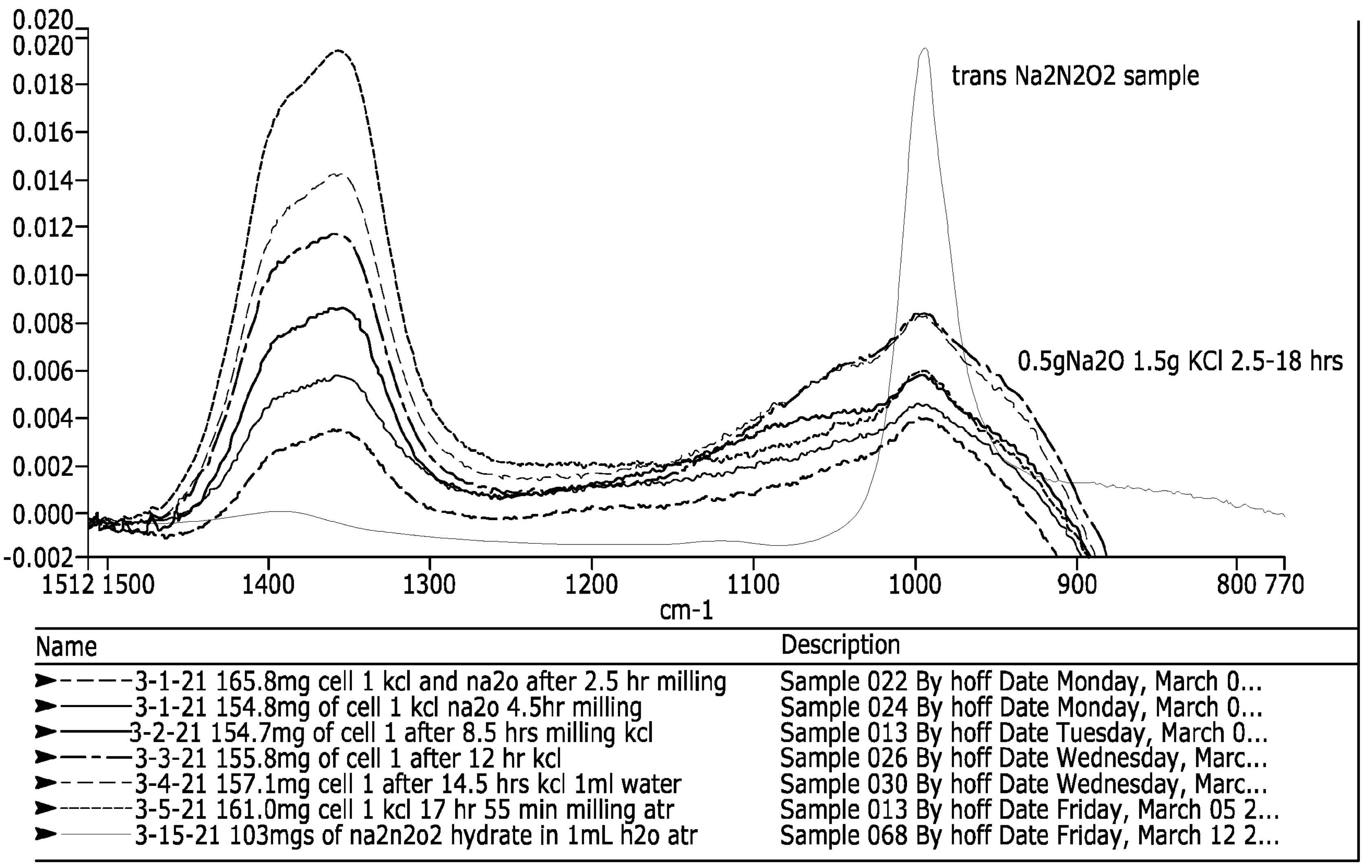
FIG. 6B shows FTIR data indicating presence of trans-$Na_2N_2O_2$.

The presence of trans-$Na_2N_2O_2$ was also observed. See FIG. 6B. Weighed samples of authentic material were used to calibrate the technique in the same manner as was done for nitrate and reasonable accuracy was obtained.

The aquation products were analyzed using FTIR. In order to estimate the amount of total $N_2O$ bound in the sample hydration studies using distilled water were performed. Samples were weighed on a glass weighing boat in the glove box. The weighing boat was then loaded into the 10 cm gas cell fitted with $CaF_2$ windows. The gas cell was sealed and taken from the glove box, evacuated and a background spectrum obtained. One of the stopcock valves which had its glass stem sealed with a rubber septum had the external region evacuated utilizing the second valve. The stopcock was then closed, 1.0 ml water added by syringe through the rubber septum. Slow opening of the stopcock allowed the water to flow into the gas cell and into the weighing boat which was positioned underneath it. Evolution of gas was immediate and, in some cases, splattering of solid occurred. In blank experiments using a Hamilton gas tight syringe and valve, a known volume of gas was added to the gas cell to allow determination of the amount of $N_2O$ liberated from the sample. As discussed above, in basic solution some trans-$Na_2N_2O_2$ is formed. This does not release $N_2O$ but upon careful acidification of the solution it is steadily evolved.

C. Pellet press samples. IR spectra in KBr pellets provides information on the ratio of bands attributed to nitrate, hyponitrite, encapsulated nitrous oxide, and also of contaminant growth of sodium hydroxide or sodium carbonate. Due to the highly moisture sensitive nature of the pellets, above that of KBr alone, a "sandwich approach" was used in which into the pellet press a layer of pure KBr (100 mg) was placed on the bottom of the pellet press assembly, a layer containing a weighed amount of sample, 2 mg of sample diluted with KBr to a total mass of 100 mg. An additional 100 mg KBr was then placed on top of this, and the pellet pressed top assembly put on. This was then compressed in the cell and an FTIR spectrum run as quickly as possible.

A representative procedure is as follows. A sample of the mixer mill product, typically KBr/$Na_2O$ matrix was weighed onto an agate mortar in the glove box. A weighed additional amount of KBr was added and the sample ground for five minutes. In order to prevent surface contamination, to the pellet press assembly was added a layer of KBr of about 100 mg, then the sample of about 100 mg, and then an additional 100 mg on top of that of KBr to make a "sandwich" pellet. This was taken quickly to the FTIR and run immediately. Over long periods of time deterioration of the pellet made this was observed, first surface water appearing on the KBr, and then slower decrease in the signals due to cis-$Na_2N_2O_2$ and appearance of peaks assigned to $N_2O$ trapped in the KBr matrix.

D. Attempt to detect a surface bound $N_2O$ on KBr pellet. The spectroscopic data from the pellet press samples gave evidence of $N_2O$ trapped in the KBr pellet. In order to test if $N_2O$ could enter the KBr or binding to the surface could be detected a blank pellet of KBr was placed in a holder in a 10 cm gas cell equipped with $CaF_2$ windows. The cell was evacuated and filled with $N_2O$ at atmospheric pressure. The cell was left for approximately five hours and then it was evacuated and a series of spectra run. The initial spectrum did not show any deviation from the gas phase spectrum, and no evidence for a shift in absorbance was observed. Without wishing to be bound to any particular theory, it is believed that the outgassing most likely occurred from the rubber o-ring seals on the FTIR gas cell and are not ascribed to any detectable bands of $N_2O$ bound to KBr.

E. Quantitative determination of peroxide content of sample. Samples were analyzed for the presence of $Na_2O_2$ using standard iodometric titration procedures employing sodium thiosulfate. In all samples measured, peroxide was detected, however the total amount of peroxide never surpassed 2% of the sodium mole fraction.

Figure 7:
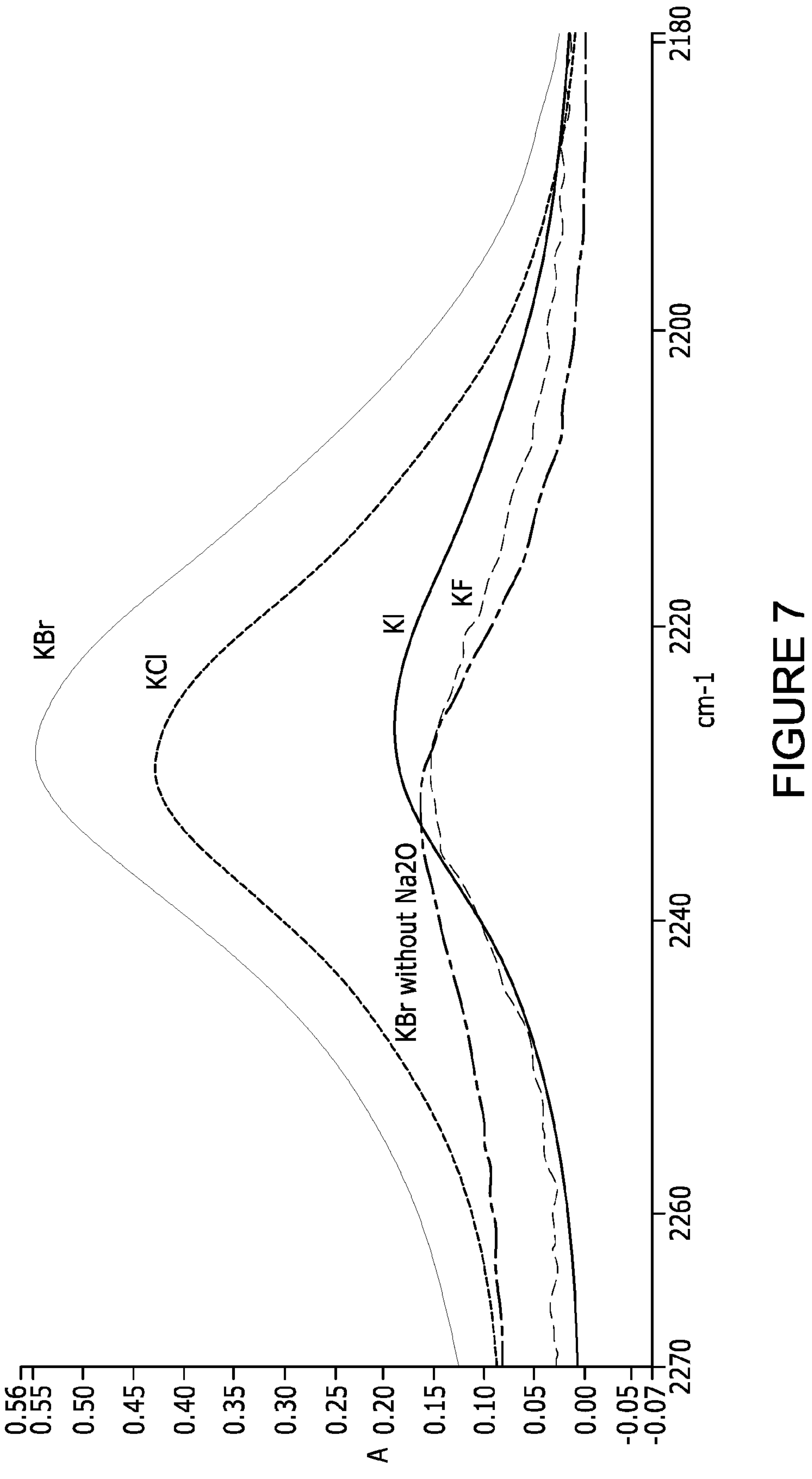
FIG. 7 shows peak position for $N_2O$ absorbance in pellets of containing $Na_2O$ (0.5 gram) in matrices of KF, KCl, KBr, and KI (1.5 gram) made in KBr pellets. Also shown is a spectrum of $N_2O$ in ball milled in only KBr.

F. Study of Nitrous Oxide Stretch Position in Alkali Halide Salts. In order to gain more information regarding the nature of the encapsulated FTIR the position of the band near 2228 $cm^{-1}$ was compared as shown in FIG. 7. As can be seen, there are only minor shifts in position as the halide is changed. In addition, the spectrum taken in pure KBr with no added $Na_2O$ is also present in a similar position. Without wishing to be bound to any particular theory, it is believed that this would tend to support encapsulation rather than coordination to the matrix.

Figure 8:
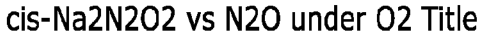
FIG. 8 shows time evolution showing the decrease in the band due to cis $Na_2N_2O_2$ and the increase in the band due to encapsulated $N_2O$.
Figure 8:
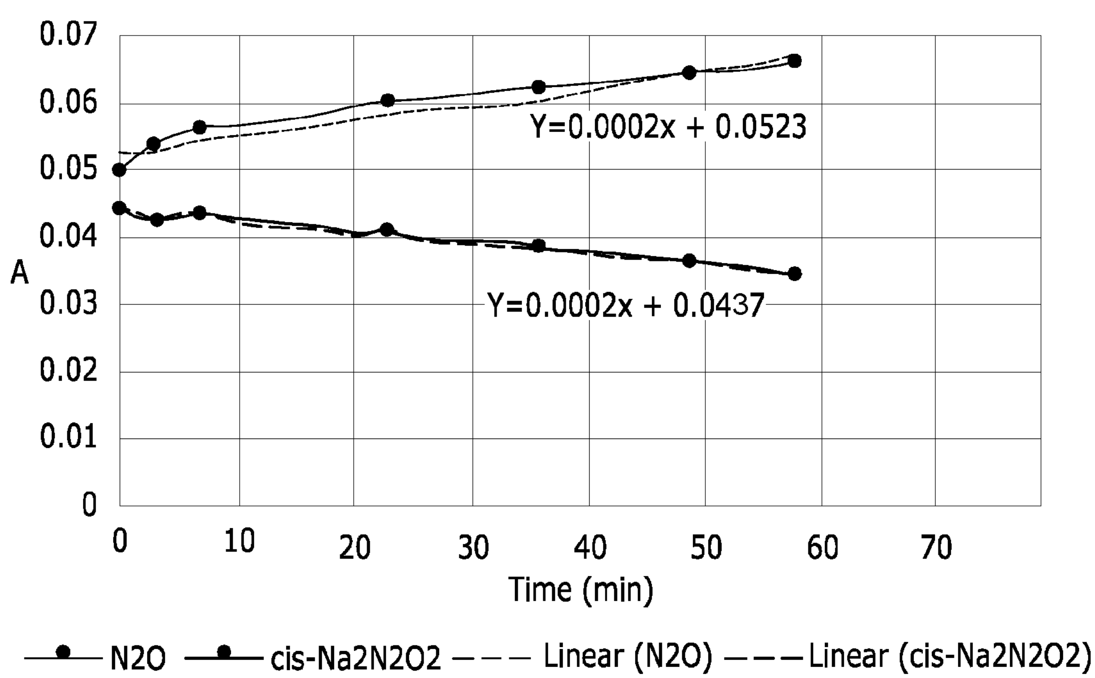
Figure 8:
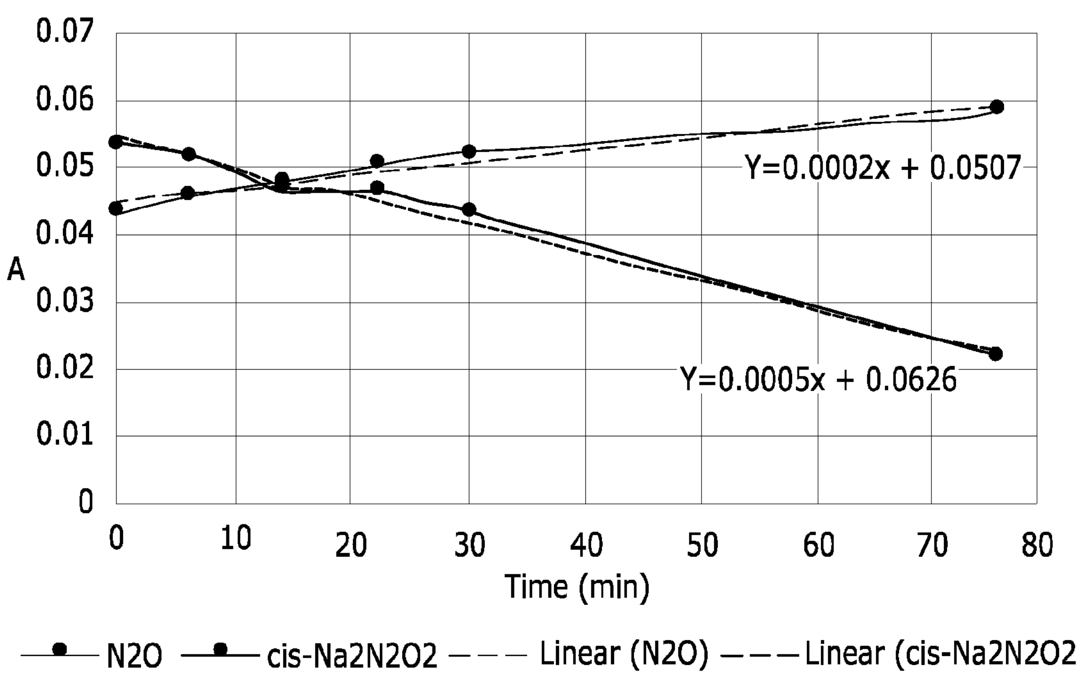

Further studies were done of the stability of the pellets under vacuum or $O_2$ atmosphere. In a typical experiment a reaction pellet was loaded into a special holder and held in the 10 cm gas cell. The holder was either evacuated or evacuated and filled with $O_2$. Data are shown in FIG. 8.

Example 2

A series of reactions of $Na_2O$ and $N_2O$ only, and in the presence of additives were studied at 140° C. in the mixer mill. This somewhat elevated temperature was chosen because the direct synthesis of cis-$Na_2N_2O_2$ by Feldman and Jansen occurred at 360° C. Reactions were performed by placing the sealed mixer mill in the oven at 140° C. and then transferring it to the mixer mill and milling at 35 Hz for 20 cycles of 30 seconds mixing followed by 90 seconds rest. Reactions were also performed in which dried molecular sieves or clinoptilolite (a naturally occurring zeolite) were added as well as potential metal catalysts. A variety of results were obtained and low yields of nitrite and nitrate formation when performed under both $N_2O$ and $O_2$, were obtained in some conditions.

Therefore, the reaction was performed at ambient temperature of 21° C. and which under active milling conditions rises to 36° C. using the current standard program of mixing. FTIR data indicated conversion to cis-$Na_2N_2O_2$. This was repeated using $^{15}N_2O$ labeled nitrous oxide and the bands observed were found to compare well with that of Feldman and Jensen.

Example 3—Further Oxidation of $Na_2N_2O_2$ (Cis and Trans) to $Na_2N_2O_3$, $NaNO_2$ and $NaNO_3$ Without being bound to any particular theory, it is believed that presence of nitric oxide can be used to promote further oxidation. A number of reactions were performed starting from trans $Na_2N_2O_2$ which even in its dehydrated form contains water. Moreover, it is believed that the reaction to oxidize nitrous oxide must go through an initial hyponitrite. Further, it is believed that the hyponitrites are sensitive complexes and can decompose in three common pathways which we illustrate with $Na_2N_2O_2$:

Protonation: $Na_2N_2O_2+H_2O \rightarrow 2\ NaOH+N_2O$

Elimination of $N_2$: $Na_2N_2O_2 \rightarrow Na_2O_2+N_2$

Elimination of 2·NO $Na_2N_2O_2+2\ \cdot NO_2 \rightarrow 2\ NaNO_2+2\ \cdot NO$ Reaction of ·NO/N2O and ground mixture of trans-$NaNO_2$ and $KO_2$. In an exploratory reaction partially dehydrated commercial samples of trans-$Na_2N_2O_2$ and $KO_2$· were ground in an agate mortar and pestle in the glove box. The mixture was loaded placed inside the 10 cm gas cell on the bottom glass cylinder. The NaCl windows of the glass barrel closed and the cell taken to a Schlenk line where it was evacuated and then filled with a mixture of approximately 60% ·NO and 40% $N_2O$. There was an immediate appearance of red brown color and the temperature of the cell rose to 50° C. from the exothermic reaction. After approximately three minutes the cell was taken to the FTIR and a series of FTIR spectra collected.

The FTIR data showed that $\cdot NO_2$ appeared and disappeared in the gas phase, and on a slower time scale NOCl was clearly detected and then vanished. The level of $N_2O$ did not appear to change significantly. In addition, the NaCl windows were coated with a thin film of $NaNO_2$ which could also be determined by its FTIR. After there were no further changes in the gas phase FTIR spectra, the cell was evacuated and filled with argon. A subsequent spectrum taken of the white solid product which could be seen on the wall of the glass cylinder showed that all hyponitrite had reacted and that a mixture of nitrate and nitrite were the products. Without wishing to be bound to any particular theory, it is believed that 1) ·NO gas enters the cell and rapidly reacts with $KO_2$· (s) in the ground mixture to form KOONO(s) as in the first step; 2) The KOONO(s) dissociates to KO· (s) and $\cdot NO_2$; the KO·(s) then combines with ·NO to form $KNO_2$ and/or combine with $\cdot NO_2$ to form $KNO_3$. In addition, at higher ·NO levels the cleavage of surface KOONO(s) could react to form $KNO_2$ and $\cdot NO_2$ in what would be a net second order process in ·NO; and 3) An unanticipated reaction was the rapid formation of NOCl, the disappearance of which is assigned to its attach on trans-$Na_2N_2O_2$(s) as well as $KO_2$· leading to the formation of $Cl^-$, $NO_2^-$, and $NO_3^-$ salts formed in the white solid with Na+ and K+ cations.

Several additional experiments were performed in slightly different conditions. In addition to reaction (19) where KO2· reacts with ·NO, pure $O_2$ (g) was added by syringe to solid trans-$Na_2N_2O_2$ under 1.5% ·NO in $N_2$. This was done using a vortex mixer and glass beads that were coated with cobalt. While this reaction did produce solid nitrite and nitrate products, examination of an aliquot of the gas mixture showed that $N_2O$ was released as well.

These results demonstrate that the disclosure provides the in situ preparation of cis-$Na_2N_2O_2$(s) by balling milling at ambient temperatures 22-35° C. under a pressure of 3 atmospheres $N_2O$(g), and its further slow oxidation to $NaNO_3$. Mechanical mixing of $Na_2O$ and $N_2O$ at ambient temperature and pressure led to appearance of cis-$Na_2N_2O_2$ in both neat $Na_2O$ as well as in $Na_2O$ diluted in KBr. Spectroscopic study of the reaction diluted in KBr allowed spectroscopic characterization of pressed pellets as well as aqueous solution and surface ATR showed that cis-$Na_2N_2O_2$ was formed and slowly converted to $NaNO_3$ overtime.

It has been surprisingly discovered that, even in the absence of added $O_2$ conversion of the cis hyponitrite to nitrate was observed. Conversion of up to 50% based on starting $Na_2O$ converted to nitrate have been achieved.

The addition of $O_2$ under static conditions with no milling to cis-$Na_2N_2O_2$ that had been formed by milling of $Na_2O$ to produce cis-$Na_2N_2O_2$ did not result in significant acceleration of nitrate production. At this point, the rate determining step appears to be formation of cis-$Na_2N_2O_2$ and this appears to occur under active milling conditions. Without wishing to be bound to any particular theory, it is believed that the rate of oxidation appears to also be linked to active mixing/milling.

Halides can play a role in nitrogen oxide chemistry. The observation of bands in the FTIR of the mixer mill product that are slightly blue shifted with respect to $N_2O$ gas, and the fact that these were not seen in other matrices suggested that an adduct between KBr and $N_2O$ might be stable. The more facile reaction in KBr under mixer mill conditions may serve to accelerate formation of cis-$Na_2N_2O_2$ under mixer mill conditions. The work of Ferdi Schueth on mixer mill oxidation has shown that decreases in temperature as well as radical formation may account for faster oxidation rates. There is a history of halide replacement in KBr pellets; indeed that technique is seldom used for that reason in organometallic chemistry since ligands may be displaced under pressure. It is known that "frustrated Lewis pairs" can be formed with $N_2O$ as shown in the elegant work of Stephan and others. During the active mixing conditions, the KBr matrix may in effect create momentary "frustrated Lewis pairs" capable of being trapped by $N_2O$. In addition high speed ball milling can produce nano-particle size materials of large surface area and higher energy.

The history of advances in catalytic chemistry has shown that initial discovery of low yield reactions may require step by step improvements to achieve a viable competitive industrial process. This work has demonstrated for the first time a one-step conversion of nitrous oxide to nitrate. The conversion is based on $Na_2O$ is on the order of 50%. However a path has been shown to exist, and the ultimate goal of nitrate conversion in a truly green process from air and water, as suggested by Lewis and Randall a century ago is feasible.

Example 4

KBr (1.5 g) that had been dried in an oven at 250° C. and $Na_2O$ (0.5 g) was loaded into the RETSCH cell with one 25 mm diameter ball. It was processed at 30 Hz for about 10 cycles, wherein each cycle involved 5 minutes mixing and 2 minutes rest. This was repeated twice, and spectra were taken which showed the slow growth of bands assigned to cis-$Na_2N_2O_2$. This was repeated and FTIR indicated qualitatively that this continued and the appearance of bands that might be assigned to nitrate formation. After approximately a net mixing time of six hours, another cycle was run and the FTIR spectrum run in KBr pellets. The samples consisted of about 20 mg of the actual sample that was diluted with an additional 50 mg of KBr and ground with a mortar and pestle in the glove box. It was loaded into the pellet press which had already been loaded with about 100 mg of KBr on the bottom, then the 70 mg sample, then another 100 mg on top. This "sandwich" approach was taken to slow the attack of atmospheric moisture on the reactive sodium oxide sample. Following the sample removal, to the RETSCH was added 100 mg of $KNO_3$ that had also been dried in the oven. The RETSCH cell was closed, this sample was taken out and filled with 30 psi (all reactions were done with an initial loading of 30 psi $N_2O$). It was run through the 30 Hz mixing for 10 repetitions as were the other reactions.

Figure 9:
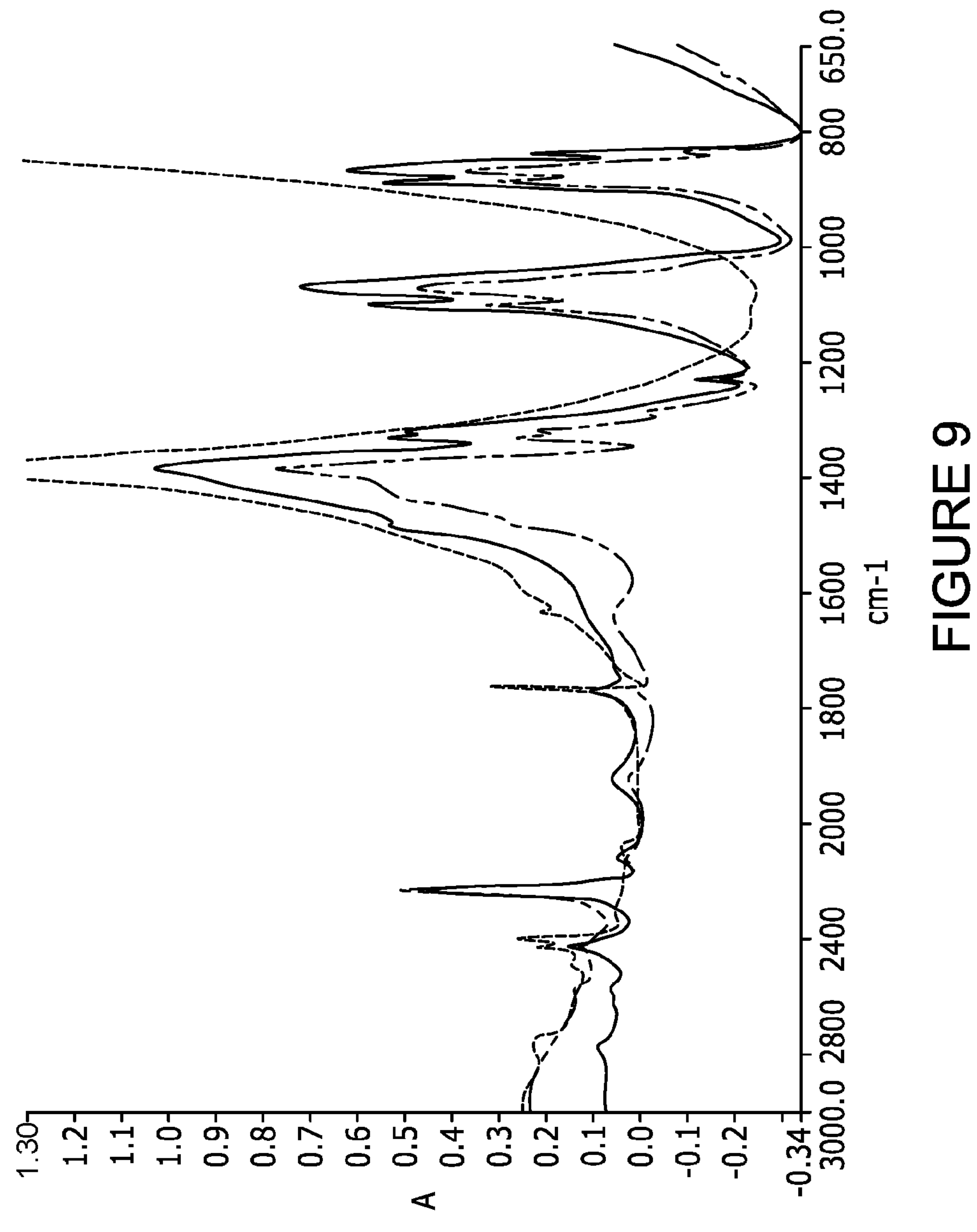
FIG. 9 shows the FTIR spectroscopic data showing initial formation of cis-$Na_2N_2O_2$ and $NaNO_3$ in KBr in the first two spectra as these peaks grow in. The dashed line spectrum is an authentic spectrum in which 100 mg of $KNO_3$ ball milled in KBr is overlaid to confirm assignment of this peak under these conditions.

An FTIR spectrum was run, and is shown in FIG. 9 together with a previous sample that was run had had 5% $KNO_3$ in KBr. The relative intensities at 1453.72 $cm^{-1}$ were assigned to the nitrate absorbance were found to be 0.75 blue (-----) spectrum. 0.39 red spectrum (--solid--), 0.62 black spectrum (solid line). The blue spectrum contained in two grams 0.1 gram $KNO_3$. The black spectrum contained 0.1 (0.75/0.62)=0.083 grams $KNO_3$, however it was diluted by a factor of 20/70, so multiplication by 70/20 provides a value of 289 mg in the original spectrum. Subtracting the 100 mg added means approximately 189 mg was present in the original sample. The red spectrum had a value of 0.39 so it would be predicted (0.39/0.75)×100=52 mg present in the sample, multiplying by 70/20=3.5 provides approximately 182 mg in the original sample. Now the original amount of $Na_2O$ was 500 mg. In the reaction $Na_2O+N_2O+2O_2\rightarrow 2\ NaNO_3$, the weight increases by a factor of 2.74 and the $Na_2O$ of 0.5 g is equivalent to 0.5×2.74=1.37 gram. The estimated yield is 189 mg/1,370 mg or approximately 14% conversion of $N_2O$ to nitrate. The data are in good agreement with literature spectra from NIST.

Example 5

Additional metal oxides have been investigated. Notably, the results show that $Na_2O_2$ in KCl produces nitrate at a fast rate and in high yields (approximately 50%). See FIGS. 10A and 10B.

Figure 10A:
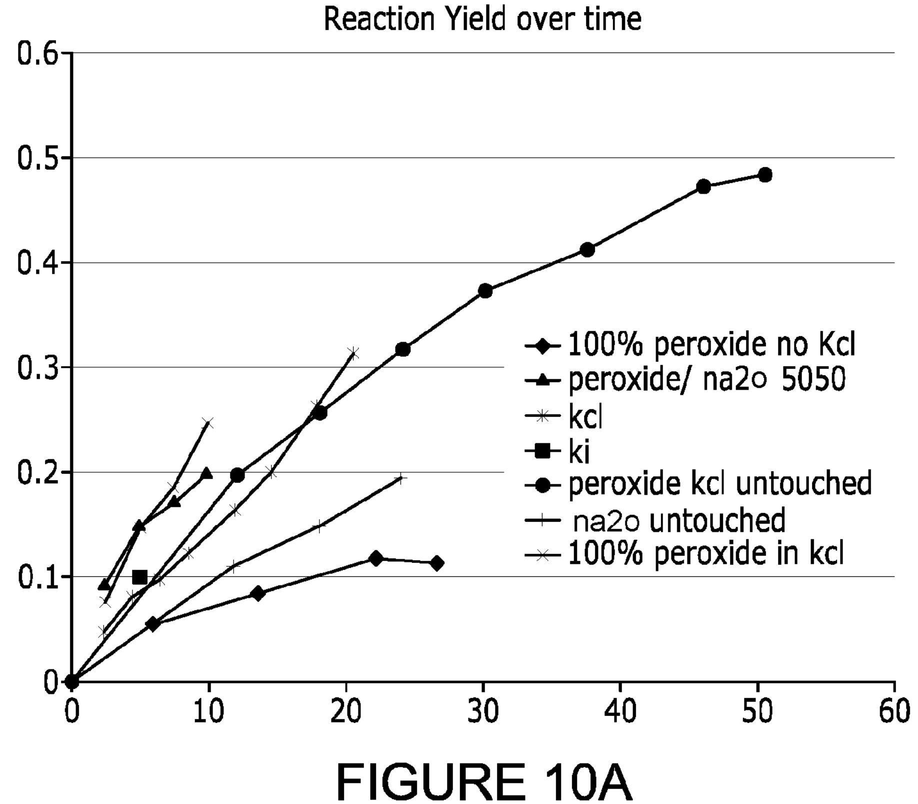
FIG. 10A shows a comparison of yield $NaNO_3$ under a variety of reaction conditions and demonstrates the production of approximately 50% yield nitrate product utilizing $Na_2O_2$ in KCl.
Figure 10B:
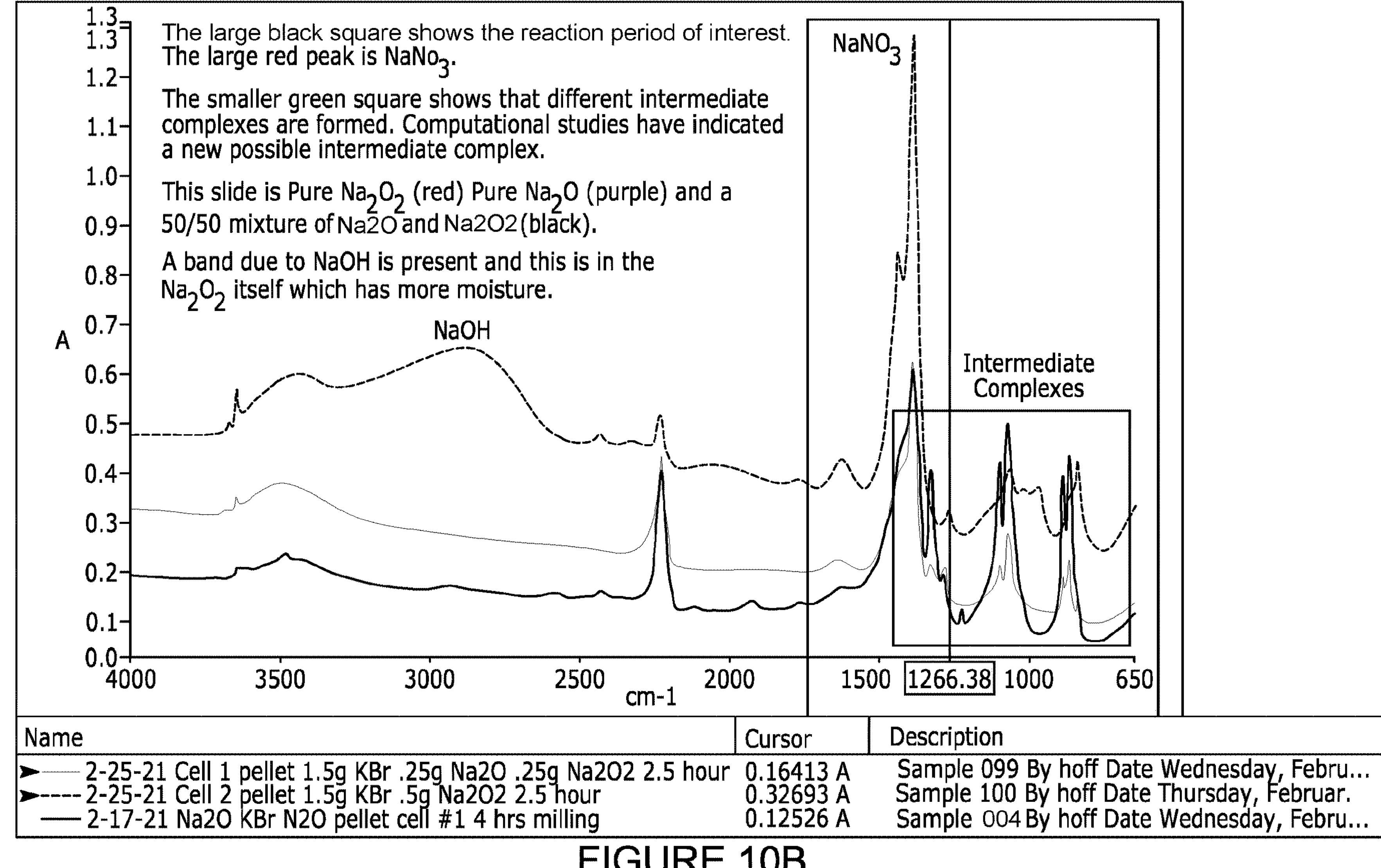
FIG. 10B shows FTIR data for reaction of $Na_2O_2$ rather than $Na_2O$ show a higher initial product yield for $Na_2O_2$. In addition they show that a different intermediate complex is present with the peroxide rather than the oxide.

The long term reaction is also faster for $Na_2O_2$ than for $Na_2O$ as depicted in FIG. 10A, which shows the percent yield nitrate as a function of time in hours for reaction of $Na_2O_2$ compared to other salts. The fact that it was competitive with the more basic and generally more reactive $Na_2O$ was surprising. It is an important advantage because $Na_2O_2$ is both cheaper but also much less hazardous to handle than is $Na_2O$.

These reactions prompted investigation of a wider range of oxides, peroxides, and superoxides. The focus of this work is on trapping nitrate in a matrix that will be compatible with direct use as fertilizer, focused on Na, K, Ca, P, Mo, Fe, Cu oxygen complexes. The potential role of transition metal catalysts on the oxidation reaction have been investigated utilizing, Cu, Co, Fe. Some beneficial enhancement of rate has been detected.

A second area that has been investigated is the investigation of injection of gases already present in the $NO_x$ gas exhaust with the metal oxides and their intermediates. This includes primarily the set of gases ·NO, ·$NO_2$, and $O_2$, wherein it has been demonstrated that the addition of ·NO (nitric oxide) to $KO_2$· (potassium superoxide) yields unique oxidation conditions in the presence of chloride ions, wherein these promoters are added at timed intervals during the milling process.

Example 6

Sodium Peroxide Reactions with $N_2O$ in the Mixer Mill—This example demonstrates progress in achieving higher yields and faster rates of reaction using sodium peroxide rather than sodium oxide for reaction with nitrous oxide. Sodium peroxide is much easier to handle, and also much less expensive to produce than sodium oxide. Comparable or even better oxidation results via different intermediates have been observed using peroxide rather than oxide. In some preliminary survey reactions $Na_2O_2$ was added as a "closer" to some test $Na_2O$ reactions. No dramatic changes were seen in the later stages of reactions. Milling $N_2O$ with $Na_2O_2$ without added KCl showed low production of $NaNO_3$ which slowed and stopped at under 3% yield, as shown in FIGS. 11A and 11B.

Figure 11A:
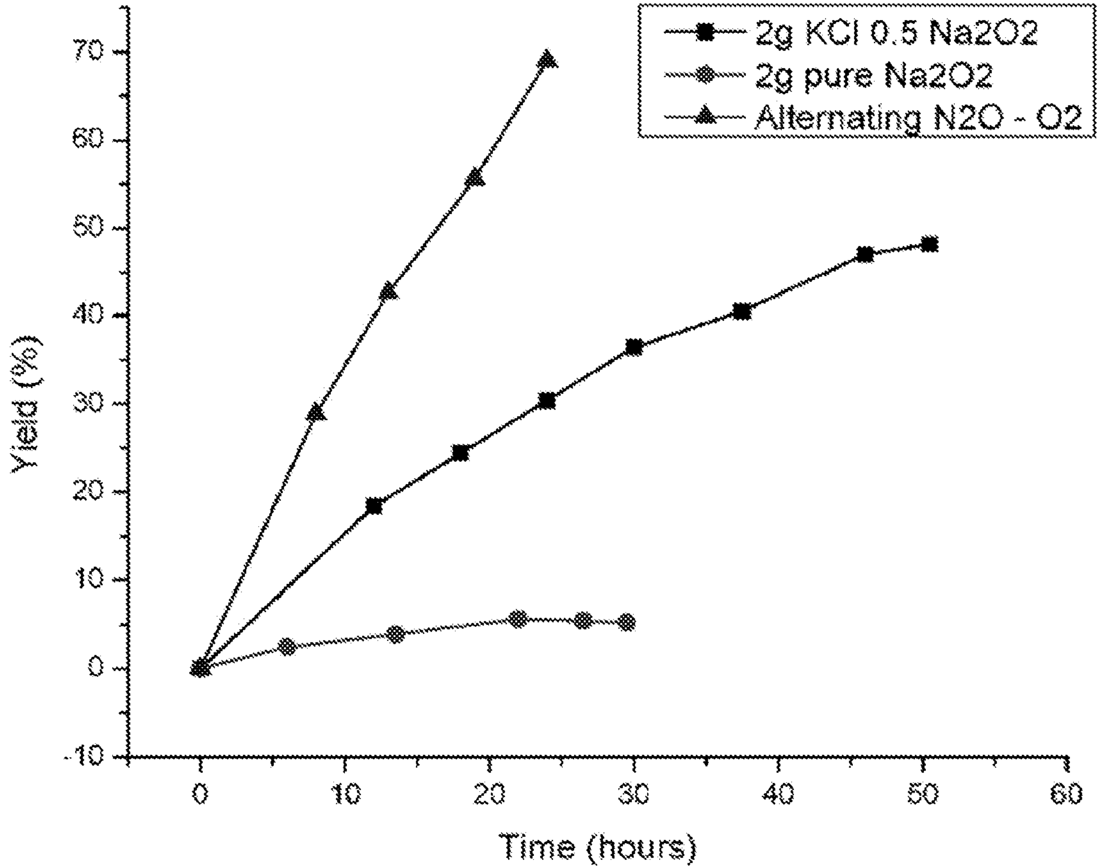
FIG. 11A shows yield as a function of milling time for oxidation of $N_2O$ in (a) $Na_2O_2$ only (b) $Na_2O_2$ (0.5 g) mixed with KCl (2 g), and (c) $Na_2O$ (0.5 g) mixed with KCl (1.5 g) and milled first under $N_2O$, then under $O_2$, and this sequence repeating under alternating gas atmospheres.
Figure 11B:
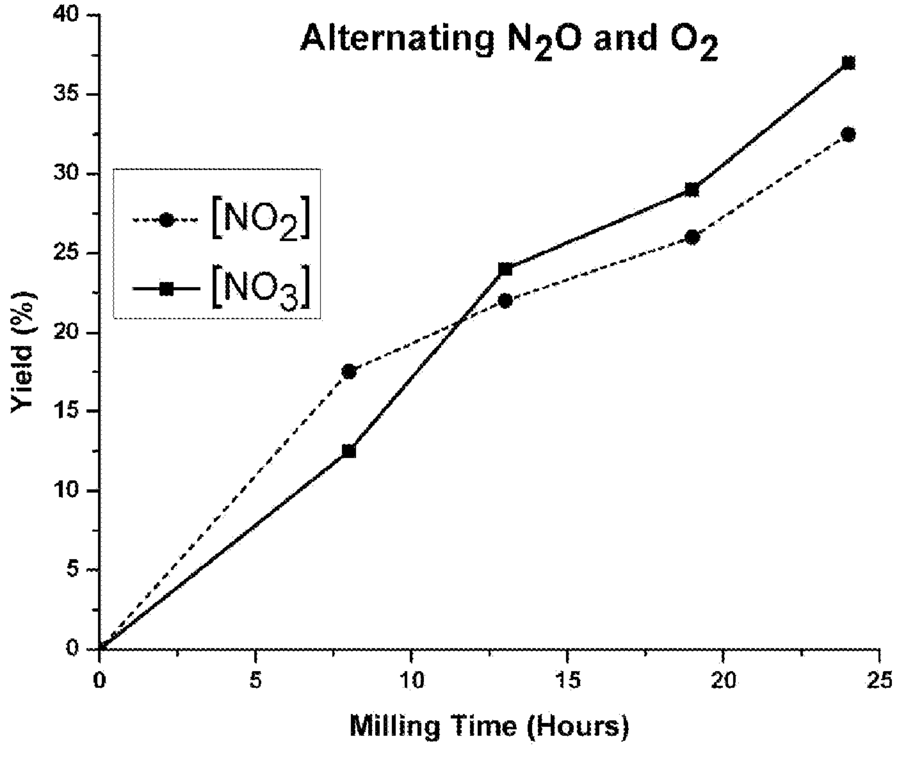
FIG. 11B shows the combined yield of about 70% conversion to nitrite and nitrate showing the roughly even distribution of the individual products in an expanded view.

As shown in the middle curve of FIG. 11A, addition of KCl to the $Na_2O_2$ led to steady production of $NaNO_3$ under $N_2O$ atmosphere (30 psi) and ambient temperature 35±5° C. No nitrite production was observed. No sign of cis-$Na_2N_2O_2$ production was observed. The logical intermediate complex would have been Angeli's salt as shown in the following equation (8):

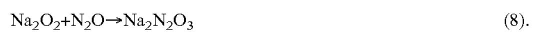

$$Na_2O_2+N_2O\rightarrow Na_2N_2O_3 \quad (8).$$

Infrared data did not show any sign of reaction (18). Aside from nitrate production, a number of small bands which did not match any known compound were observed but did not accumulate in significant amounts. The unknown bands observed did not match those of an authentic sample of $Na_2N_2O_3$. The possibility that $Na_2N_2O_3$ is produced but rapidly transformed to a different unknown complex or to product cannot be excluded. Reactions of various mixed ratios of $Na_2O$ and $Na_2O_2$ give approximately additive behavior initially and then appear to converge to a common rate. It should be remembered that commercial $Na_2O$ often contains 10-20% $Na_2O_2$ and as discussed later interconversion between oxide and peroxide may also occur during the catalytic cycle.

Reaction of $Na_2O$ with Alternation of Atmosphere from $N_2O$ to $O_2$ in Sequence—An exciting aspect of the data in FIG. 11A was that obtained in the alternating gas reaction sequence shown at the top of the figure. In this experiment, a mixture of $Na_2O$ and KCl was milled under $N_2O$ atmosphere for 5 hours. The $N_2O$ (30 psi) was then evacuated and replaced by $O_2$ (30 psi) and milling continued for 3 hours.

The results shown in FIG. 11A demonstrate that $Na_2O_2$ alone in the absence of added salt does not react significantly with nitrous oxide. Moreover, the FTIR spectral data showed that conversion of formed cis-$Na_2N_2O_2$ to $NaNO_2$ and $NaNO_3$ was near quantitative based on the $N_2O$ that was bound and then converted to nitrite and nitrate. In some embodiments, the yield over 24 hours is approximately 70-90%, based on $Na_2O$ as the limiting reagent. The estimated yield estimates are typically lower based on $Na_2O$ as the limiting reagent since commercially available $Na_2O$ contains impurities including $Na_2O_2$ and also sodium hydroxide and sodium carbonate which are less reactive than $Na_2O$. The amount of impurities can differ on the age of the $Na_2O$ sample and the extent of its exposure to atmospheric moisture. This typically lowers the actual observed yield from the spectroscopic rate of conversion. The combined product yield during the first eight hours was approximately 30%. The combined product yield over 24 hours was approximately 70% assuming the $Na_2O$ was 100% pure. The spectroscopic data show near quantitative binding of $N_2O$ when an excess of $Na_2O$ is present, and near quantitative oxidation of the formed cis-$Na_2N_2O_2$ that is so formed when excess $Na_2O$ is present. During the reaction process some of the $Na_2O$ is also converted to $Na_2O_2$. In some embodiments, a 70% conversion of "$Na_2O$" to nitrate and nitrite is achieved in 24 hours reproducibly. The lower apparent yield so calculated is not based on $N_2O$ which is converted but on $Na_2O$ which is converted. The $Na_2O_2$ that is so formed however may be reacted with ·NO, ·$NO_2$, and $O_2$ to form nitrate. That is done, as described herein, and serves to more fully utilize the activity of the added "$Na_2O$".

An additional surprise was the initial formation of predominantly $NaNO_2$ after the first cycle of reaction with $O_2$. Small amounts of $NaNO_2$ have been observed in several reactions but never in the amount seen in the alternating sequence reactions. A significant loss of cis-$Na_2N_2O_2$ in the direct reaction with $O_2$ also was observed. We conclude that oxidation of cis-$Na_2N_2O_2$ by $3O_2$ (gas) is significantly faster than oxidation by $N_2O$ (gas). That was not expected. As an oxidant, $N_2O$ delivers a single O atom and has no barriers with respect to spin change. In contrast $3O_2$ delivers two O atoms but spin conservation rules must be overcome.

Reaction of $Na_2O$ with Fixed Gas Mixture 67% $O_2$ and 33% $N_2O$—In further experiments a fixed tank with a two to one ratio of 67% $O_2$ and 33% $N_2O$ was used as the oxidizing gas. In contrast to the alternating gas sequence described above which was successful, the use of this fixed gas mixture did not show significant improvement and was found to be inferior to use of $N_2O$ alone. A plausible explanation is shown in reaction (9) where conversion of sodium oxide to sodium peroxide occurs:

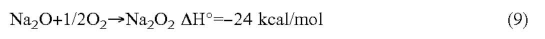

$$Na_2O+1/2O_2 \rightarrow Na_2O_2\ \Delta H°=-24\ \text{kcal/mol} \quad (9)$$

In effect this converted the reaction over to that of $Na_2O_2$ alone but at a partial pressure of $N_2O$ that was ⅓ that used in other experiments. Moreover, as shown in the following equation (10), sodium peroxide is competent to convert nitrite to nitrate and regenerate $Na_2O$:

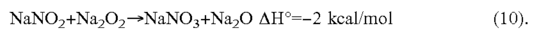

$$NaNO_2+Na_2O_2 \rightarrow NaNO_3+Na_2O\ \Delta H°=-2\ \text{kcal/mol} \quad (10).$$

In addition, $N_2O$ may also convert $Na_2O$ to $Na_2O_2$ with elimination of dinitrogen as shown in reaction (11):

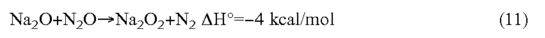

$$Na_2O+N_2O \rightarrow Na_2O_2+N_2\ \Delta H°=-4\ \text{kcal/mol} \quad (11)$$

This adds a complexity, but also a versatility to the catalytic system. Without wishing to be bound to any particular theory, it suggests that addition of transition metals known to activate peroxide catalytically may be possible.

Catalytic Oxidation of $NaNO_2$ to $NaNO_3$ in the Mixer Mill—The alternating gas feed milling approach provides an improved yield. As shown in the data in FIGS. 11A and 11B that $NaNO_2$ may be produced initially when cis-$Na_2N_2O_2$ is produced in the alternating gas sequence described in the previous section. This prompted an investigation of the relative rates of oxidation of $NaNO_2$ to $NaNO_3$:

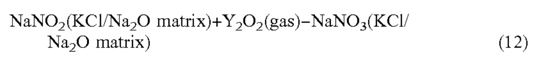

$$NaNO_2(\text{KCl}/Na_2O\ \text{matrix})+Y_2O_2(\text{gas})-NaNO_3(\text{KCl}/Na_2O\ \text{matrix}) \quad (12)$$

and

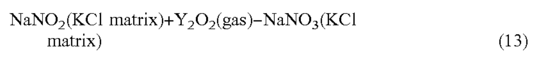

$$NaNO_2(\text{KCl matrix})+Y_2O_2(\text{gas})-NaNO_3(\text{KCl matrix}) \quad (13)$$

It was surprisingly discovered that the oxidation of nitrite to nitrate occurs as shown in eqn. (12) and at a speed comparable to the rate of reaction starting from $Na_2O$ and $N_2O$ in the salt matrix. The salt mixture changes during the reaction as $Na_2O$ is converted to $NaNO_2$ and $NaNO_3$. At some point an in situ production of a composition approaching a eutectic mixture may occur and in effect lower the melting point. Work in liquid nitrate salt mixtures which melt in the 100 to 150° C. (e.g., 100, 110, 120, 130, 140 or 150° C.) range but keeping the mixer mill at temperatures below this may result in formation of a temporary molten state during an active collision in a localized area. Without wishing to be bound to any particular theory, it is possible that low melting eutectic mixtures could undergo local melting during an active collision and then solidify and also entrap nitrous oxide in the process.

Example 7

Gas-Solid State and Gas-Gas Reactions (Radical)—There are potential reactions in which the mixture of $N_2O$, ·NO and ·$NO_2$ may allow utilization of the members of this "toxic trio" to accelerate their own destructive oxidation to nitrate. We have investigated this reaction in an FTIR gas cell in which we have combined ground powders of trans-$Na_2N_2O_2$(s) and KO2·(s) and exposed it to ·NO gas.

A typical reaction setup is shown in FIG. 12A in which a ground solid containing $KO_2$· and trans-$Na_2N_2O_2$(s) initially forms ·$NO_2$ (brown/orange gas) in the infrared cell as well as other compounds. The nitrogen dioxide reacts over a 10 minute time period to completely remove nitrogen dioxide and convert the solid to a white powder containing nitrite and nitrate. In this reaction the infrared cell had NaCl windows and these were attacked by ·$NO_2$(g) to form $NaNO_2$ and +·Cl(g) which rapidly reacted with +·NO(g) to form NOCl(g). Within 10 minutes the cell was clean and the solid was bleached white and shown to contain nitrite and nitrate. This sequence of reactions occurred much more rapidly than the reactions in the mixer mill. The solid product contained nitrite and nitrate and no other detectable products. However during the reaction nitrous oxide was eliminated from the trans hyponitrite in part which meant that this oxidation was not compatible with nitrate formation from the trans-hyponitrite. This implies that in general the cis-hyponitrite is more prone to oxidation as opposed to decomposition and nitrous oxide elimination.

A complex series of reactions occurred and this was continuously monitored by gas phase FTIR in a cell with NaCl windows. There was a bright flash of orange color which occurred immediately and NOCl appeared and then disappeared within minutes in the gas phase infrared spectrum. The spectrum of solid $NaNO_2$ appeared on the NaCl gas windows of the cell. At the end of the experiment the powder at the bottom of the FTIR cell as shown in was white (FIG. 12B) and contained only a mixture of $NaNO_2$ and $NaNO_3$.

A plausible explanation of the reaction in FIGS. 12A and 12B which occurred in minutes is based on an initial reaction of potassium superoxide with nitric oxide to form potassium peroxynitrite as shown in the first step (13i).

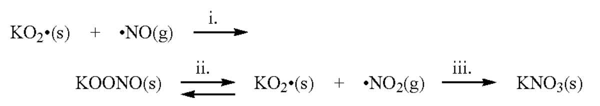

This compound is meta-stable and slowly decomposes to the nitrate isomer. The step in eqn. (13 ii) involves reversible cleavage of the KO—ONO bond to form radical products with $\cdot NO_2(g)$ escaping to the gas phase. The step in reaction (13 iii) involves rotation of the escaped radical and its recombination to form an N—O linkage and stable nitrate product.

The $\cdot NO_2$ radical is a much more reactive species than is $\cdot NO$. Whereas $\cdot NO$ does not attack NaCl, $\cdot NO_2$ reacts rapidly as shown in eqn. (14):

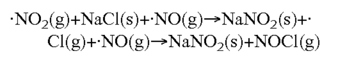

$$\cdot NO_2(g)+NaCl(s)+\cdot NO(g)\rightarrow NaNO_2(s)+\cdot Cl(g)+\cdot NO(g)\rightarrow NaNO_2(s)+NOCl(g)$$

The NOCl(gas) is formed in the gas phase and is a highly reactive oxidant which is subsequently neutralized by either $KO_2\cdot$ or trans-$Na_2N_2O_2$. It was observed that some $N_2O$ was present at the end of the reaction. That indicates that the NOCl may have eliminated this by a complex mechanism. This may be dependent upon a number of factors including surface area of the solid.

The radical reaction mechanisms suggested that it might be possible to "neutralize" the $Na_2O^-_2$ that is expected to be present in reactor 2 after oxidation of nitrite to nitrate by oxygen as described above. Under standard conditions, a mixture of 1.5 grams KCl, 0.5 grams $Na_2O$, and 0.5 grams $NaNO_2$ were ball milled under ambient conditions and 3 atm $O_2$ for a total of 4 hours. This produced the expected mixture of $NaNO_3$ and $Na_2O^-_2$ produced as shown in eqn. (2). This mixture was loaded into an FTIR gas cell fitted with $CaF_2$ windows and loaded into the cell on a stainless steel trough in the bottom of the cell. The cell was removed from the glove box, placed in the FTIR spectrometer and filled with $\cdot NO(g)$ 1.5% in $N_2$ at a total pressure of 1.5 atm. No reaction occurred. At that time 5 mL of $O_2$ was added to the cell through a rubber septum fitted to the stopcock to initiate the reaction.

FTIR data at ambient temperature were obtained and are shown in FIG. 13. In this reaction the peaks assigned to $\cdot NO$ decrease continuously. The bands due to $\cdot NO_2$ grow and then decrease as does the peak due to a small equilibrium amount of the nitrogen dioxide dimer $N_2O_4$. Bands assigned to NOCl, as shown in FIG. 4, grow rapidly and then decrease over about 6 hours.

Figure 14:
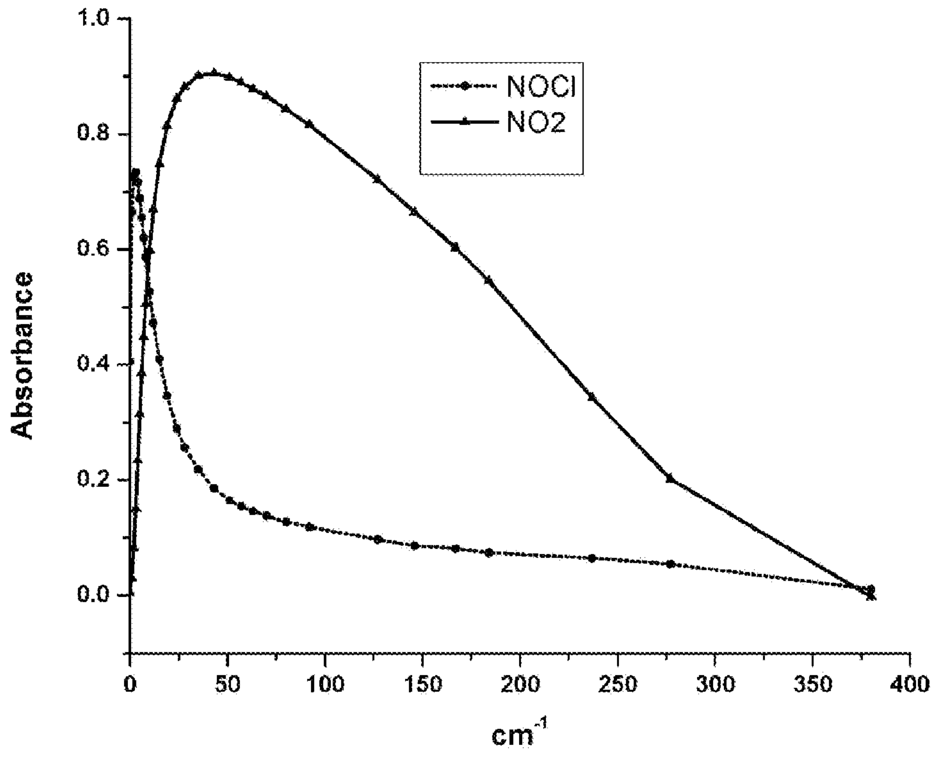
FIG. 14 shows the absorbance versus time for the reaction shown in FIG. 13.

FIG. 14 shows the absorbance versus time for the reaction shown in FIG. 13. The rapid increase in $\cdot NO_2$ concentration following addition of $O_2$ also decreases over time as shown. The concentration of NOCl grows relatively rapidly but decays more slowly and is not complete until about 6 hours.

The reaction mixture was left over the weekend and an FTIR spectrum of both gas and solid run on Monday. The gas spectrum showed that $\cdot NO$, $\cdot NO_2$, and NOCl had all gone to zero. A small amount of $N_2O$ which was present in the $\cdot NO$ from the beginning was left unchanged. This is in keeping with the relatively inert character of $N_2O$ which was not oxidized under these conditions. An FTIR spectrum of the solid material showed it to contain only $NaNO_3$ and a low level of peroxide. Though not yet proven, the reaction sequence shown in eqns (15)-(17) are considered probable in accounting for the observed products.

(15)

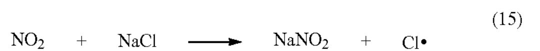

(16)

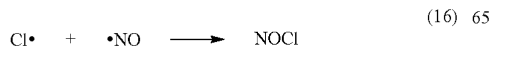

-continued (17)

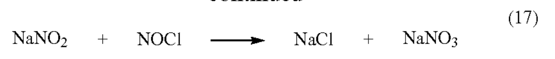

All references, including publications, patent applications, and patents, cited herein are hereby incorporated by reference to the same extent as if each reference were individually and specifically indicated to be incorporated by reference and were set forth in its entirety herein.

Recitation of ranges of values herein are merely intended to serve as a shorthand method of referring individually to each separate value falling within the range and each endpoint, unless otherwise indicated herein, and each separate value and endpoint is incorporated into the specification as if it were individually recited herein.

The use of the terms "a" and "an" and "the" and similar referents in the context of describing the invention (especially in the context of the following claims) are to be construed to cover both the singular and the plural, unless otherwise indicated herein or clearly contradicted by context. The use of the term "at least one" followed by a list of one or more items (for example, "at least one of A and B") is to be construed to mean one item selected from the listed items (A or B) or any combination of two or more of the listed items (A and B), unless otherwise indicated herein or clearly contradicted by context. The terms "comprising," "having," "including," and "containing" are to be construed as open-ended terms (i.e., meaning "including, but not limited to,") unless otherwise noted. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (for example, "such as") provided herein, is intended merely to better illuminate the invention and does not pose a limitation on the scope of the invention unless otherwise claimed. No language in the specification should be construed as indicating any non-claimed element as essential to the practice of the invention.

REFERENCES

[1] Haber, F.; "Thermodynamik technischer Gasreaktionen. Sieben Vorlesungen". *Ber. Bunsen-Ges.* 1905. 11 519.

[2] "Road map to a US Hydrogen Economy" Fuel Cell and Hydrogen Energy Association 2020.

[3] Ostwald, W. Jan. 9, 1902, "Improvements in the Manufacture of Nitric Acid and Nitrogen Oxides", Patent GB190200698A.

[4] Ravishankara, A. R.; Daniel, J. S.; Portmann, R. W., Nitrous Oxide (N2O): The Dominant Ozone-Depleting Substance Emitted in the 21st Century. *Science* 2009, 326, 123-125. (b) Brandes, J. A.; Devol, A. H.; Deutsch, C., New Developments in the Marine Nitrogen Cycle. *Chem. Rev.* 2007, 107, 577-589. (c) Shiflett, M. B.; Niehaus, A. M. S.; Yokozeki, A. "Separation of N2O and CO2 Using Room-Temperature Ionic Liquid [bmim][BF4]". *J. Phys. Chem. B* 2011, 115, 3478-3487.

[5] "BASF-The Right Choice for Nitric Acid Plant" http://www.catalysts.basf.com/p02/USWeb Internet/ catalysts/en_GB/function/conversions:/publish/content/microsites/catalysts/prod s-inds/process-catalysts/BF-9834_US_N2O_and_DeNOX_Technote.pdf.

[6] Lewis, G. N.; Randall, M., Thermodynamics-The Free Energy of Chemical Substances. *McGraw Hill, New York* 1923.

[7] (a) Gekhman, A. E.; Stolyarov, I. P.; Shestakov, A. F.; Shilov, A. E.; Moiseev, I. I., "Oxidation of Molecular Nitrogen with Hydrogen Peroxide", *Russ. Chem. Bull.* 2003, 52, 768. (b) Shestakov, A. F.; Shilov, A. E., "On the Coupled Oxidation-reduction Mechanism of Molecular Nitrogen Fixation", *Russ. Chem. Bull.* 2001, 50, 2054. (c) Shestakov, A. F.; Emelyanova, N. S. "Theoretical Study of Oxidation of Molecular Nitrogen with Vanadium Peroxo Complexes", *Russ. Chem. Bull.* 2003, 52, 1455. (d) Shestakov, A. F.; Emelyanova, N. S. "Is Nitrous Oxide an Intermediate Product in the Oxidation of Molecular Nitrogen by Vanadium Peroxo Complexes?", *Mendeleev Commun.* 2004, 14, 117. (e) Gaidei, T. P. "Nitrous Oxide: Properties, Producing, Grounds of Manipulations, and Fields of Application", *Russ. J. Appl. Chem.* 2009, 86, 109.

[8] Elishav, O.; Mosevitzky Lis, B.; Miller, E. M.; Arent, D. J.; Valera-Medina, A.; Grinberg Dana, A.; Shter, G. E.; Grader, G. S., Progress and Prospective of Nitrogen-Based Alternative Fuels. *Chem. Rev.* 2020, 120 (12), 5352-5436.

[9] (a) Gomez, J. Z.; Calvet, N.; Starace, A. K.; Glatzmaier, G. C.; "Ca(NO3)2-NaNO3-KNO3 Molten Salt Mixtures for Direct Thermal Energy Storage Systems in Parabolic Trough Plants", *J. Solar Energy Eng.* 2013, 135 021017-1. (b) Pfleger, N.; Bauer, T.; Martin, C.; Eck, M.; Wörner, A.; "Thermal energy storage—overview and specific insight into nitrate salts for sensible and latent heat storage", *Beilstein. J. Nanotechnol.* 2015; 6: 1487-1497.

[10] Ramesh, K.; Reddy, D. D., Chapter Four—Zeolites and Their Potential Uses in Agriculture. In *Advances in Agronomy*, Sparks, D. L., Ed. Academic Press: 2011; Vol. 113, pp 219-241.

[11] (a) Feldmann, C.; Jansen, M., ZurKenntnis von cis-Natrium hyponitrit. *Z. Anorg. Allg. Chem.* 1997, 623, 1803-1809. (b) Feldmann, C.; Jansen, M., cis-Sodium hyponitrite—A new route and a crystal structure analysis. *Angew. Chem. Int. Edit.* 1996, 35 (15), 17281730.

[12] Nguyen, K. A.; Gordon, M. S.; Montgomery, J. A.; Michels, H. H., "Structures, Bonding, and Energetics of N2O2 Isomers", *J, Phys. Chem.* 1994, 98, 10072-10078.

[13] Bilke, M.; Losch, P.; Vozniuk, O.; Bodach, A.; Schuth, F., Methane to Chloromethane by Mechanochemical Activation: A Selective Radical Pathway. *J. Am. Chem. Soc.* 2019, 141 (28), 11212-11218.

[14] Bayrakdar, T. A. C. A.; Nahra, F.; Davis, J. V.; Gamage, M. M.; Captain, B.; Temprado, M.; Marazzi, M.; Saab, M.; Van Hecke, K.; Ormerod, D.; Hoff, C. D.; Nolan, S. P., Dinuclear Gold(I) Complexes Bearing Alkyl-Bridged Bis(N-heterocyclic carbene) Ligands as Catalysts for Carboxylative Cyclization of Propargylamine: Synthesis, Structure, and Kinetic and Mechanistic Comparison to the Mononuclear Complex [Au(IPr)Cl]. *Organometallics* 2020, 39 (15), 2907-2916.

[15] Davis, J. V.; Gamage, M. M.; Guio, O.; Bayrakdar, T. A. C. A.; Nolan, S. P.; Temprado, M.; Captain, B.; Hoff, C. D., The Mechanism of Carboxylative Cyclization of Propargylamine by N-Heterocyclic Carbene Complexes of Au(I). *J. Organomet. Chem.* 2020, online.

[16] Davis, J. D.; Gamage, M. M.; Temprado, M.; Captain, B.; Hoff, C. D. Comparisons of CO2 and N2O reactivity among two trialkyltin systems. *Manuscript in Preparation.*

[17] Davis, J. D.; Gamage, M. M.; Temprado, M.; Captain, B.; Hoff, C. D. Reactivity of (PPh3)4Pt toward nitric oxide and reactions of the hyponitrite product. *Manuscript in Preparation.*

[18] Palluccio, T. D.; Germain, M. E.; Silvia, J. S.; Serafim, L. F.; Davis, J. V.; Hoff, C. D.; Temprado, M.; Cummins, C. C.; Rybak-Akimova, E. V., "Diverse Mechanisms for Binding of RC| N to V(N[$^t$Bu]Ar]3 (S=1) and Mo(N[$^t$Bu]Ar]3 (S=3/2). An Unexpected Role for Dispersive Interactions in Kinetics and Thermodynamics of Weak Ligand Binding." *Manuscript in Preparation.*

[19] Lymar, S. V.; Hurst, J. K., CO2-catalyzed one-electron oxidations by peroxynitrite: Properties of the reactive intermediate. *Inorg. Chem.* 1998, 37 (2), 294-301.

[20] (a) Hase, S.; Kayaki, Y.; Ikariya, T., NHC-Gold(I) Complexes as Effective Catalysts for the Carboxylative Cyclization of Propargylamines with Carbon Dioxide. *Organometallics* 2013, 32 (19), 5285-5288. (b) Hase, S.; Kayaki, Y.; Ikariya, T., Mechanistic Aspects of the Carboxylative Cyclization of Propargylamines and Carbon Dioxide Catalyzed by Gold(I) Complexes Bearing an N-Heterocyclic Carbene Ligand. *ACS Catal.* 2015, 5 (9), 5135-5140.

[21] Wright, A. M.; Hayton, T. W., Understanding the Role of Hyponitrite in Nitric Oxide Reduction. *Inorg. Chem.* 2015, 54 (19), 9330-9341.

[22] (a) Efremenko, I.; Poverenov, E.; Martin, J. M. L.; Milstein, D., DFT Study of the Structure and Reactivity of the Terminal Pt(IV)-Oxo Complex Bearing No Electron-Withdrawing Ligands. *J. Am. Chem. Soc.* 2010, 132 (42), 14886-14900. (b) Andrews, M. A.; Gould, G. L.; Voss, E. J., "Evidence for Platinum(II) Oxo Intermediates in Reactions of (Diphosphine)platinum(II) Carbonate Complexes", *Inorg. Chem.* 1996, 35, 57405742.

[23] Cenini, S.; Ugo, R.; La Monica, G.; Robinson, S. D., Zerovalent platinum chemistry. VIII. The reactions of nitric oxide with tris- and tetrakis (triphenylphosphine) platinum(0). *Inorg. Chim. Acta* 1972, 6, 182-184.

[24] Li, J. J.; Li, W.; Sharp, P. R., Phosphine-based platinum(II) hydroxo and oxo complexes. *Inorg. Chem.* 1996, 35 (3), 604-613.

[25] Mayer, T.; Beck, W.; Bottcher, H. C., Crystal and Molecular Structure of the trans-Hyponitrite Compound Ph3Sn(ONNO)SnPh3. *Z Anorg. Allg. Chem.* 2011, 637 (3-4), 345-347.

[26] Cai, X. C.; Majumdar, S.; Fortman, G. C.; Koppaka, A.; Serafim, L.; Captain, B.; Temprado, M.; Hoff, C. D., Thermodynamic, Kinetic, Structural, and Computational Studies of the Ph3Sn—H, Ph3Sn—SnPh3, and Ph3Sn—Cr(CO)(3)C5Me5 Bond Dissociation Enthalpies. *Inorg Chem* 2016, 55 (20), 10751-10766.

[27] Quinga, E. M. Y.; Mendenhall, G. D., Substituent effects and isokinetic relations in the homolysis of hyponitrite esters. The question of free-radical homoconjugation. *The Journal of Organic Chemistry* 1985, 50 (16), 2836-2840. Joo, H.; Biswas, M. A. S.; Hill, W. E.; Mckee, M. L., An experimental and theoretical evaluation of the reactions of silver hyponitrite with phosphorus halides. In search of the elusive phosphorus-containing hyponitrites. *J. Phys. Chem. A* 2005, 109 (7), 1420-1429.

[28] Blunden, S. J.; Hill, R.; Ruddick, J. N. R., The structure of bis(trialkyltin) carbonates: Evidence for two non-equivalent tin sites. *J. Organomet. Chem.* 1984, 267 (2), c5-c8.

[29] Holmes, R. R., Organotin Cluster Chemistry. *Accounts Chem. Res.* 1989, 22 (5), 190197.

[30] Farias, M. J. S.; Cheuquepan, W.; Tanaka, A. A.; Feliu, J. M., Nonuniform Synergistic Effect of Sn and Ru in Site-Specific Catalytic Activity of Pt at Bimetallic Surfaces toward CO Electro-oxidation. *Acs Catal.* 2017, 7 (5), 3434-3445.

[31] (a) Achord, P.; Temrado, M.; Fortman, G. C.; Isrow, D.; Weir, J.; McDonough, K. E.; Hoff, C.D.; Muckerman, J. T.; Fujita, E., The Role of [ -Backbonding in the Strengths of N-donor to Molybdenum Bonds. Experimental and Computational Studies of Enthalpies of Binding of Dintrogen, Diazoalkanes, Azides, Nitriles, and Pyridines to Mo($P^iPr3$)2(CO)3. *Inorg. Chem.* 2009, 48, 7891. (b) Muckerman, J. T.; Fujita, E.; Hoff, C. D.; Kubas, G. J., Theoretical investigation of the binding of small molecules and the intramolecular agostic interaction at tungsten centers with carbonyl and phosphine ligands. *J. Phys. Chem. B* 2007, 111 (24), 6815-6821. (c) Fortman, G. C., Kegl, T., Li, Q. S.; Zhang, X.; Schaefer, H. F., Xie, Y.; R.; King, R. B.; Telser, J.; and Hoff, C. D.; "Spectroscopic Detection and Theoretical Confirmation of the Role of Cr2(CO)5(C5R5)2 and ▯Cr(ketene)(CO)2(C5R5) as Intermediates in Carbonylation of N═N═CHSiMe3 to O═C═CHSiMe3 Catalyzed by | Cr(CO)3(C5R5) (R═H, CH3)", *J. Am. Chem. Soc.* 2007, 129, 14388. (d) Sukcharoenphon, K.; Ju, T. D.; Abboud, K. A.; Hoff, C. D.; "Dinuclear Oxidative Addition of N—H and S—H Bonds at Chromium. Reaction of [ Cr(CO)3C5Me5 with {o-(HA) C6H4S—Cr(CO)3C5Me5} (A=S, NH) Yielding [[ $^2$-o-([ -A)C6H4SCr(C5Me5)]2 and H—Cr(CO) 3C5Me5. *Inorg. Chem.* 2002, 41, 6769-6774. (e) Sukcharoenphon, K.; Capps, K. B.; Abboud, K. A.; Hoff, C. D.; "Synthesis and Structure of W(|| $^2$-SPy)2 (CO)3 (SPy=2-Mercaptopyridine) and Its Reaction with PyS-SPy to Yield W([ $^2$-SPy)4; NO to Yield W([ $^2$-SPy)2(NO)2, and with NO/PyS-SPy to Yield W([ $^2$-SPy)3(NO)", *Inorg. Chem.* 2001, 40, 2402-2408. (f) Capps, K. B.; Bauer, A.; Sukcharoenphon, K.; Hoff, C. D.; "Kinetic and Thermodynamic Studies of Reaction of Cr(CO)3C5Me5 and PhS Cr(CO)3C5Me5 with NO. Reductive Elimination of Thermodynamically Unstable Molecules HNO and RSNO Driven by Formation of the Strong Cr—NO Bond", *Inorg. Chem.* 1999, 38, 6206.(g) Capps, K. B.; Bauer, A.; Abboud, K. A.; Hoff, C. D.; "Reaction of NO with Tungsten Thiolate and Thiol Complexes: Elimination of PhSNO from W(phen)(CO)2(SPh)2, CO from W(phen)(CO)2 (1,2-(–S)2-Arene, and HNO from W(phen)(CO)3 (RSH)", *Inorg. Chem.* 1999, 38, 6216. (h) Gonzalez, A. A., Zhang, K., Mukerjee, S. L., Kubas, G. K., Khalsa, G. R. K., Hoff, C. D. "Thermodynamic and Kinetic Studies of Molecular Hydrogen and Nitrogen Complexes of Cr, Mo, and W", *ACS Symposium Series,* 428 133 1990. (i) Gonzalez, A. A.; Hoff C. D. "The Entropy of Binding of Molecular Hydrogen and Nitrogen in the Complexes (P(C6H11)3)2M$(CO)_3$, M=Cr, Mo, W, *Inorg. Chem.,* 1989, 28, 4295. (j) Kubas, G. J.; Gonzalez, A. A.; Zhang, K.; Nolan, S. P.; Lopez de la Vega, R.; Hoff, C. D. "Thermodynamic and Kinetic Study of the Complexes (PCy3)2W(CO)3(L), L=H2, N2, NCCH3, pyridine, P(OMe)3, and CO," *Organometallics,* 1988, 7, 2429. (k) Gonzalez, A. A., Mukerjee, S. L., Chou, S. J., Zhang, K., Hoff, C. D., "Synthesis of PCy3)2Cr(CO)3 and its Reactions with Hydrogen, Nitrogen, and Other Ligands, *J. Am. Chem. Soc.* 1988, 110, 4419

[32] (a) Johnson, A. R.; Baraldo, L. M.; Cherry, J. P. F.; Tsai, Y. C.; Cummins, C.C.; Kryatov, S. V.; Rybak Akimova, V.; Capps, K. B.; Hoff, C. D.; Haar, C. M.; Nolan, S. P.; "Selective Cleavage of the Nitrous Oxide N—N Bond by Three-Coordinate Molybdenum Complexes: Mechanistic Influences from Kinetic, Calorimetric, and Reacitvity Studies", *J. Am. Chem. Soc.,* 2001, 123, 7271-7286. (b) Palluccio, T.; Cai, X.; Majumdar, S.; Serafim, L. F.; Tomson, N.; Wieghardt, K.; Cazin, C. S. J.; Nolan, S. P.; Rybak-Akimova, E. V.; Gonzalez, M. A. F.; Temprado, M.; Captain, B.; Hoff, C. D.; "Ligand-Directed Reactivity in Dioxygen and Water Binding to cis-[Pd(NHC)2($n^2$-O2)]", *J. Am. Chem. Soc* 2018, 140, 1, 264-276. (c) Majumdar S.; Stauber J. M.; Palluccio T. D.; Cai, X.; Velian, A.; Rybak-Akimova, E. V.; Temprado, M.; Cummins, C. C.; Hoff, C. D.; "Role of Axial Base Coordination in Isonitrile Binding and Chalcogen Atom Transfer to Vanadium(III) Complexes", *Inorg. Chem.* 2014, 53, 11183. (d) Palluccio, T.; Rybak-Akimova, E. V.; Cai, X.; Majumdar, S.; Temprado, M.; Silvia, J. S.; Cozzolino, A. F.; Tofan, D.; Cummins, C. C.; Captain, B.; Hoff, C. D., "Oxygen Atom Transfer from N-oxides to a Vanadium(III) Complex: Enhanced Reaction Rates for Organic Adducts of Nitrous Oxide and Mesityl Nitrile Oxide", *J. Am. Chem. Soc.,* 2013 135 11357. (e) Palluccio, T.; Rybak-Akimova, E. V.; Cai, X.; Majumdar, S.; Temprado, M.; Silvia, J. S.; Cozzolino, A. F.; Tofan, D.; Cummins, C. C.; Captain, B.; Hoff, C. D., "Oxygen Atom Transfer from N-oxides to a Vanadium (III) Complex: Enhanced Reaction Rates for Organic Adducts of Nitrous Oxide and Mesityl Nitrile Oxide". *J. Am. Chem. Soc.,* 2013 135 11357. (f) Cai, X.; Majumdar, S.; Fortman, G. C.; Frutos, L. M.; Temprado, M.; Clough, C. R.; Cummins, C. C.; Germain, M. E.; Palluccio, T.; Rybak-Akimova, E. V.; Captain, B.; Hoff. C. D. "Thermodynamic, Kinetic, and Mechanistic Study of Oxygen Atom Transfer from Mesityl Nitrile Oxide to Phosphines and to a Terminal Metal Phosphido Complex", *Inorg. Chem.* 2011, 50, 9620.

[33] Gunaydin, H.; Houk, K. N., "Molecular Dynamics Simulation of the HOONO Decomposition and the HO·/NO2· Caged Radical Pair in Water", *J. Am. Chem. Soc.* 2008, 130, 10036-10037.

[34] La Pierre, H. S.; Arnold, J.; Bergman, R. G.; Toste, F. D., Carbon Monoxide, Isocyanide, and Nitrile Complexes of Cationic, d(0) Vanadium Bisimides: pi-Back Bonding Derived from the pi Symmetry, Bonding Metal Bisimido Ligand Orbitals. *Inorg. Chem.* 2012, 51 (24), 13334-13344.

[35] Davis, J. D.; Temprado, M.; Cummins, C. C.; Hoff, C. D. Unpublished work on N2O.

[36] Temprado, M.; Hoff, C. D. Unpublished on NHC and CO2.

[37] (a) Poskrebyshev, G. A.; Shafirovich, V.; Lymar, S. V., Hyponitrite radical, a stable adduct of nitric oxide and nitroxyl. *J. Am. Chem. Soc.* 2004, 126 (3), 891-899. (b) Lymar, S. V.; Shafirovich, V.; Poskrebyshev, G. A., One-electron reduction of aqueous nitric oxide: A mechanistic revision. *Inorg. Chem.* 2005, 44 (15), 5212-5221. (c) Poskrebyshev, G. A.; Shafirovich, V.; Lymar, S. V., Disproportionation pathways of aqueous hyponitrite radicals (HN2O2 center dot/N2O2 center dot-). *J. Phys. Chem. A* 2008, 112 (36), 8295-8302.

[38] (a) Oza, T. M.; Oza, V. T., The Thermal Decomposition of Calcium Hyponitrite Tetrahydrate. *J. Chem. Soc.* 1953, (Mar), 909-913. (b) Oza, T. M.; Thaker, R. H., The Thermal Decomposition of Silver Hyponitrite. *J. Am. Chem. Soc.* 1955, 77 (19), 49764980. (c) Oza, T. M., Reactions of Hyponitrites and Nitrites. *Nature* 1955, 175 (4452), 385-386.

[39] (a) Ogle, C. A.; Martin, S. W.; Dziobak, M. P.; Urban, M. W.; Mendenhall, G. D., Decomposition Rates, Synthesis, and Spectral Properties of a Series of Alkyl Hyponitrites. *J. Org. Chem.* 21, 3728-3733. (b) Mendenhall, G. D., The Lewis Acid-Catalyzed Reaction of Trans-Hyponitrite Ion with Alkyl-Halides. *Tetrahedron Lett* 1983, 24 (5), 451-452. (c) Abata, J. D.; Dziobak, M. P.; Nachbor, M.; Mendenhall, G. D., Thermal-Decomposition of Sodium Trans-Hyponitrite. *J. Phys. Chem. Us.* 1989, 93 (8), 3368-3372.

[40] (a) Koppenol, W. H.; Moreno, J. J.; Pryor, W. A.; Ischiropoulos, H.; Beckman, J. S., Peroxynitrite, a Cloaked Oxidant Formed by Nitric-Oxide and Superoxide. *Chem. Res. Toxicol.* 1992, 5 (6), 834-842. (b) Squadrito, G. L.; Pryor, W. A., Mapping the reaction of peroxynitrite with CO2: Energetics, reactive species, and biological implications. *Chem. Res. Toxicol.* 2002, 15 (7), 885-895.

[41] (a) Addison, C. C.; Gamlen, G. A.; Thompson, R., The Oxidation of Sodium Hyponitrite and Sodium Alpha-Oxyhyponitrite with Dinitrogen Tetroxide. *J. Chem. Soc.* 1952, (Feb), 346-356. (b) Vosper, A. J., Oxidation of Sodium Hyponitrite and Sodium Oxyhyponitrite with Dinitrogen Tetroxide. *J. Chem. Soc. A* 1968, (10), 2403-&. (c) Goyal, M. R.; Bhatnagar, P.; Mittal, R. K.; Gupta, Y. K., Redox Chemistry of Hyponitrite.3. Oxidation by Hexacyanoferrate(Iii) in Aqueous Alkaline-Solution. *Indian J. Chem. A* 1989, 28 (4), 280-283. (d) Goyal, M. R.; Bhatnagar, P.; Mittal, R. K.; Gupta, Y. K., Redox Chemistry of Hyponitrous Acid.4. Stoichiometry, Kinetics and Mechanism of Oxidation by Cerium(Iv) in Acid Sulfate-Solutions, and Determination of Hyponitrous Acid in Acid Perchlorate Solutions. *Indian J. Chem. A* 1989, 28 (5), 382387.

[42] (a) Ryder, O. S.; Ault, A. P.; Cahill, J. F.; Guasco, T. L.; Riedel, T. P.; Cuadra-Rodriguez, L. A.; Gaston, C. J.; Fitzgerald, E.; Lee, C.; Prather, K. A.; Bertram, T. H., On the Role of Particle Inorganic Mixing State in the Reactive Uptake of N2O5 to Ambient Aerosol Particles. *Environ. Sci. Technol.* 2014, 48 (3), 1618-1627. (b) D'Ambro, E. L.; Lee, B. H.; Liu, J. M.; Shilling, J. E.; Gaston, C. J.; Lopez-Hilfiker, F. D.; Schobesberger, S.; Zaveri, R. A.; Mohr, C.; Lutz, A.; Zhang, Z. F.; Gold, A.; Surratt, J. D.; Rivera-Rios, J. C.; Keutsch, F. N.; Thornton, J. A., Molecular composition and volatility of isoprene photochemical oxidation secondary organic aerosol under low- and high-NOx conditions. *Atmos. Chem. Phys.* 2017, 17 (1), 159-174. (c) Mitroo, D.; Gill, T. E.; Haas, S.; Pratt, K. A.; Gaston, C. J., CINO2 Production from N2O5 Uptake on Saline Playa Dusts: New Insights into Potential Inland Sources of CINO2. *Environ. Sci. Technol.* 2019, 53 (13), 7442-7452. (d) Gaston, C. J., Reexamining Dust Chemical Aging and Its Impacts on Earth's Climate. *Accounts Chem. Res.* 2020, 53 (5), 1005-1013.

[43] (a) Khivantsev, K.; Vargas, C. G.; Tian, J. S.; Kovarik, L.; Jaegers, N. R.; Szanyi, J.; Wang, Y., Economizing on Precious Metals in Three-Way Catalysts: Thermally Stable and Highly Active Single-Atom Rhodium on Ceria for NO Abatement under Dry and Industrially Relevant Conditions**. *Angew. Chem. Int. Edit.* 2020. (b) Gao, F.; Kwak, J. H.; Szanyi, J.; Peden, C. H. F., Current Understanding of Cu-Exchanged Chabazite Molecular Sieves for Use as Commercial Diesel Engine DeNO(x) Catalysts. *Top Catal.* 2013, 56 (15-17), 1441-1459. (c) Li, W. Z.; Kovarik, L.; Mei, D. H.; Engelhard, M. H.; Gao, F.; Liu, J.; Wang, Y.; Peden, C. H. F., A General Mechanism for Stabilizing the Small Sizes of Precious Metal Nanoparticles on Oxide Supports. *Chem Mater* 2014, 26 (19), 5475-5481. (d) Gao, F.; Mei, D. H.; Wang, Y. L.; Szanyi, J.; Peden, C. H. F., Selective Catalytic Reduction over Cu/SSZ-13: Linking Homo- and Heterogeneous Catalysis. *J. Am. Chem. Soc.* 2017, 139 (13), 4935-4942. (e) Mei, D.; Ge, Q. F.; Szanyi, J.; Peden, C. H. F., First-Principles Analysis of NOx Adsorption on Anhydrous gamma-Al2O3 Surfaces. *J. Phys. Chem. C* 2009, 113 (18), 7779-7789. (f) Kwak, J. H.; Tonkyn, R. G.; Kim, D. H.; Szanyi, J.; Peden, C. H. F., Excellent activity and selectivity of Cu-SSZ-13 in the selective catalytic reduction of NOx with NH3. *J. Catal.* 2010, 275 (2), 187-190. (g) Szanyi, J.; Kwak, J. H.; Kim, D. H.; Burton, S. D.; Peden, C. H. F., NO2 adsorption on BaO/Al2O3: The nature of nitrate species. *J Phys Chem B* 2005, 109 (1), 27-29. (h) Kwak, J. H.; Mei, D. H.; Yi, C. W.; Kim, D. H.; Peden, C. H. F.; Allard, L. F.; Szanyi, J., Understanding the nature of surface nitrates in BaO/gamma-Al2O3 NOx storage materials: A combined experimental and theoretical study. *J. Catal.* 2009, 261 (1), 17-22.

[44] Schuth et al Journal of the American Chemical Society 2019, 141, 28, 11212-11218

[45] Blomberg, M. R. A. Role of the Two Metals in the Active Sites of Heme Copper Oxidases-A Study of NO Reduction in cbb(3) Cytochrome c Oxidase. Inorg. Chem. 2020, 59 (16), 11542-11553. DOI: 10.1021/acs.inorgchem.0c01351

[46] Severin, K. Synthetic chemistry with nitrous oxide. Chem. Soc. Rev. 2015, 44 (17), 6375-6386. DOI: 10.1039/C5CS00339C

[47] Liu, H. Z.; Klein, W.; Sani, A.; Jansen, M. Pressure induced phase transition and amorphization of Na3ONO2. Phys. Chem. Chem. Phys. 2004, 6 (5), 881-883. DOI: 10.1039/B312984E

[48] Senna, M.; Turianicova, E.; Zorkovska, A.; Makreski, P.; Kanuchova, M.; Scholz, G.; Balaz, M.; Balaz, P.; Sepelak, V.; Hahn, H. Modification of tin oxide nanoparticles by fluorocarbon solids via a mechanochemical route. J. Nanopart. Res. 2015, 17 (9). DOI: 10.1007/s11051-015-3166-3

[49] Miller, T. M.; Grassian, V. H. A mechanistic study of nitrous oxide adsorption and decomposition on zirconia. Catal. Lett. 1997, 46 (3-4), 213-221. DOI: 10.1023/A:1019058232683

[50] (a) Meizyte, G.; Green, A. E.; Gentleman, A. S.; Schaller, S.; Schollkopf, W.; Fielicke, A.; Mackenzie, S. R. Free electron laser infrared action spectroscopy of nitrous oxide binding to platinum clusters, Pt-n(N2O)(+). Phys. Chem. Chem. Phys. 2020, 22 (33), 18606-18613. DOI: 10.1039/D0CP02800B (b) Kokalj, A.; Kobal, I.; Matsushima, T. A DFT study of the structures of N2O adsorbed on the Pd(110) surface. J. Phys. Chem. B 2003, 107 (12), 2741-2747. DOI: 10.1021/jp026672o

[51] (a) Keresztury, G.; Incze, M.; Soti, F.; Imre, L. CO2 Inclusion Bands in Ir-Spectra of Kbr Pellets. Spectrochim Acta A 1980, 36 (11), 1007-1008. DOI: 10.1016/0584-8539(80)80181-4 (b) Hadjiivanov, K. I.; Panayotov, D. A.; Mihaylov, M. Y.; Ivanova, E. Z.; Chakarova, K. K.; Andonova, S. M.; Drenchev, N. L. Power of Infrared and Raman Spectroscopies to Characterize Metal-Organic Frameworks and Investigate Their Interaction with Guest Molecules. Chem. Rev. 2021, 121 (3), 1286-1424. DOI: 10.1021/acs.chemrev.0c00487.

[52] Blackwelder, P.; Temprado, M.; Davis, J. V.; Guio, O.; Captain, B.; Hoff, C. D. work in progress.

What is claimed:

1. A process for preparing a nitrate comprising contacting a nitrogen oxide with a metal oxide under milling conditions to form a nitrate.

2. The process of claim 1, wherein the nitrogen oxide is selected from the group consisting nitric oxide (NO), nitrogen dioxide ($NO_2$) nitrogen trioxide ($NO_3$), nitrous oxide ($N_2O$), dinitrogen dioxide ($N_2O_2$), dinitrogen trioxide ($N_2O_3$), dinitrogen tetroxide ($N_2O_4$), dinitrogen pentoxide ($N_2O_5$), nitrosylazide ($N_4O$), oxatetrazole ($N_4O$), trinitramide ($N_4O_6$), and a combination thereof.

3. The process of claim 1, wherein the nitrogen oxide comprises nitrous oxide.

4. The process of claim 1, wherein the metal oxide comprises an alkali metal oxide.

5. The process of claim 4, wherein the alkali metal oxide is selected from the group consisting of sodium oxide ($Na_2O$), sodium peroxide ($Na_2O_2$), lithium peroxide ($Li_2O_2$), potassium oxide ($K_2O$), and a combination thereof.

6. The process of claim 5, wherein the alkali metal oxide is selected from the group consisting of sodium oxide, sodium peroxide, and a combination thereof.

7. The process of claim 1, wherein the milling conditions is ball milling.

8. The process of claim 4, wherein an alkali metal hyponitrite is formed upon contacting the nitrogen oxide with the alkali metal oxide.

9. The process of claim 8, wherein the alkali metal hyponitrite is sodium hyponitrite ($Na_2N_2O_2$).

10. The process of claim 9, wherein the sodium hyponitrite is cis-sodium hyponitrite.

11. The process of claim 1, further comprising contacting the nitrogen oxide with the metal oxide in the presence of a catalyst.

12. The process of claim 11, wherein the catalyst comprises a metal halide salt.

13. The process of claim 12, wherein the metal halide salt comprises a potassium halide.

14. The process of claim 13, wherein the potassium halide comprises potassium bromide.

15. The process of claim 1, further comprising contacting the nitrogen oxide with the metal oxide in the presence of a solvent.

16. The process of claim 15, wherein the solvent comprises a liquid nitrate salt.

17. The process of claim 16, wherein the liquid nitrate salt comprises an alkali metal nitrate salt.

18. The process of claim 17, wherein the alkali metal nitrate salt is selected from the group consisting lithium nitrate, sodium nitrate, potassium nitrate, and a combination thereof.

19. The process of claim 1, further comprising contacting the nitrogen oxide with the metal oxide at a temperature of 300° C. or less.

20. The process of claim 19, wherein the temperature is 150° C. or less.

21. The process of claim 19, wherein the temperature is 35° C. or less.

22. The process of claim 19, wherein the temperature is 25° C. or less.

23. The process of claim 1, further comprising contacting the nitrogen oxide with the metal oxide at ambient pressure.

24. The process of claim 1, wherein the milling conditions comprise milling in the presence of oxygen gas.

25. The process of claim 24, wherein the nitrogen oxide is nitrous oxide.

26. The process of claim 25, wherein the ratio of nitrous oxide to oxygen is about 1:2 by volume.

27. The process of claim 24, wherein the nitrogen oxide and oxygen gas are introduced in alternating sequences.

* * * * *